(12) United States Patent
Tanaka et al.

(10) Patent No.: US 8,278,914 B2
(45) Date of Patent: *Oct. 2, 2012

(54) ROTATION ANGLE DETECTOR

(75) Inventors: Kengo Tanaka, Tokyo (JP); Fumihiko Abe, Tokyo (JP); Dongzhi Jin, Tokyo (JP)

(73) Assignee: The Furukawa Electric Co., Ltd, Tokyo (JP)

( * ) Notice: Subject to any disclaimer, the term of this patent is extended or adjusted under 35 U.S.C. 154(b) by 680 days.

This patent is subject to a terminal disclaimer.

(21) Appl. No.: 12/304,407

(22) PCT Filed: Jun. 14, 2007

(86) PCT No.: PCT/JP2007/062048
§ 371 (c)(1),
(2), (4) Date: Sep. 22, 2009

(87) PCT Pub. No.: WO2007/145296
PCT Pub. Date: Dec. 21, 2007

(65) Prior Publication Data
US 2010/0060272 A1 Mar. 11, 2010

(30) Foreign Application Priority Data

Jun. 14, 2006 (JP) ................................. 2006-164772
Jul. 21, 2006 (JP) ................................. 2006-199663

(51) Int. Cl.
*G01B 7/30* (2006.01)
*G01P 3/48* (2006.01)
*G01L 3/00* (2006.01)

(52) U.S. Cl. ............... 324/207.25; 324/167; 73/862.335

(58) Field of Classification Search .................. 324/167, 324/207.23, 207.25; 73/862.331–862.335
See application file for complete search history.

(56) References Cited

U.S. PATENT DOCUMENTS

| | | | | |
|---|---|---|---|---|
| 6,532,831 | B2 * | 3/2003 | Jin et al. .................. | 73/862.331 |
| 7,210,360 | B2 * | 5/2007 | Schroeder ................ | 73/862.332 |
| 7,360,459 | B2 * | 4/2008 | Abe et al. ................. | 73/862.332 |

(Continued)

FOREIGN PATENT DOCUMENTS

EP    1026068 A2    8/2000

(Continued)

OTHER PUBLICATIONS

EP Office Action dated Apr. 7, 2011 for EP Application No. 07745305.8, 7 pages.

(Continued)

*Primary Examiner* — Joshua Benitez Rosario
(74) *Attorney, Agent, or Firm* — Turocy & Watson, LLP

(57) ABSTRACT

A rotation angle detector for detecting a rotation angle of a detectable rotation body, comprises: a primary rotation body to be attached to the detectable rotation body and to rotate as integral with the detectable rotation body; a secondary rotation body to rotate as a predetermined rotation ratio for the primary rotation body; a primary rotation detection mechanism to output a signal to be varied periodically as corresponding to a rotation of the primary rotation body; a secondary rotation detection mechanism to output a signal to be varied periodically as corresponding to a rotation of the secondary rotation body; a signal processing unit to calculate the rotation angles of the primary and the secondary rotation bodies using the signals that the primary and the secondary rotation detection mechanisms output; and an operation processing unit to calculate the rotation angle of the detectable rotation body.

9 Claims, 12 Drawing Sheets

U.S. PATENT DOCUMENTS

| | | | |
|---|---|---|---|
| 7,497,132 B2* | 3/2009 | Harata et al. | 73/862.335 |
| 8,001,851 B2* | 8/2011 | Abe et al. | 73/862.335 |
| 8,129,986 B2* | 3/2012 | May | 324/207.25 |
| 8,159,215 B2* | 4/2012 | Kobayashi | 324/207.25 |
| 8,164,332 B2* | 4/2012 | Bartos et al. | 324/252 |
| 8,183,857 B2* | 5/2012 | Tanaka et al. | 324/207.2 |
| 2001/0045135 A1* | 11/2001 | Horiuchi et al. | 73/862.333 |
| 2006/0207310 A1* | 9/2006 | Kuwata et al. | 73/1.37 |
| 2010/0007341 A1* | 1/2010 | Tanaka et al. | 324/207.25 |
| 2010/0045271 A1* | 2/2010 | Tanaka et al. | 324/207.13 |
| 2010/0109655 A1* | 5/2010 | Tanaka et al. | 324/207.25 |
| 2010/0148764 A1* | 6/2010 | Abe et al. | 324/207.25 |
| 2010/0185412 A1* | 7/2010 | Abe et al. | 702/151 |
| 2010/0315074 A1* | 12/2010 | Abe et al. | 324/207.25 |

FOREIGN PATENT DOCUMENTS

| | | |
|---|---|---|
| JP | 2001-505667 A | 4/2001 |
| JP | 2002098522 | 4/2002 |
| JP | 2004-226355 A | 8/2004 |
| JP | 2005-249769 A | 9/2005 |
| WO | 2007/139868 A2 | 12/2007 |

OTHER PUBLICATIONS

International Search Report dated Jul. 17, 2007 for PCT Application Serial No. PCT/JP2007/062048, 2 Pages.

* cited by examiner

⇩ NORMALIZATION

⇩ θ1 CALCULATION

⇩ NORMALIZATION

⇩ θ2 CALCULATION

| In a case where R = 1800 | | | | T1<T2 | | | T1>T2 | | |
|---|---|---|---|---|---|---|---|---|---|
| The Number of Items | n | T1 | T2 | Gear Ratio k | Allowable Error | T2 | Gear Ratio k | Allowable Error |
| 1 | 1 | 360 | 450.00 | 5/4 | 90.00 | 300.00 | 5/6 | 60.00 |
| 2 | 2 | 180 | 200.00 | 5/9 | 20.00 | 163.64 | 5/11 | 16.36 |
| 3 | 3 | 120 | 128.57 | 5/14 | 8.57 | 112.50 | 5/16 | 7.50 |
| 4 | 4 | 90 | 94.74 | 5/19 | 4.74 | 85.71 | 5/21 | 4.29 |
| 5 | 5 | 72 | 75.00 | 5/24 | 3.00 | 69.23 | 5/26 | 2.77 |
| 6 | 6 | 60 | 62.07 | 5/29 | 2.07 | 58.06 | 5/31 | 1.94 |

FIG. 6

ROTATION ANGLE DETECTOR

CROSS-REFERENCE TO RELATED APPLICATIONS

This application is a US national stage filing of Patent Cooperation Treaty (PCT) Application Serial No PCT/JP2007/062048 (WO2007/149296), filed Jun. 14, 2007, which claims priority to Japanese Patent Application No. 2006-164772, filed Jun. 14, 2006, and Japanese Patent Application No. 2006-199663, filed Jul. 21, 2006, the entireties of which are incorporated herein by reference.

TECHNICAL FIELD

The present invention relates to a rotation angle detector for detecting a rotation angle of a rotation body.

BACKGROUND ART

A conventional rotation angle detecting device as disclosed in a patent document 1 comprises a primary rotation body to rotate as integral with a rotation body and two of secondary rotation bodies to rotate as coupled with such the primary rotation body. Moreover, the primary rotation body and two of the secondary rotation bodies individually comprises a gear, wherein the number of teeth of the individual gears are different from each other. Further, each of the gears of the individual secondary rotation bodies and the gear of the primary rotation body are meshed with each other respectively. Furthermore, each of the secondary rotation bodies individually comprises a magnet and an anisotropic magnetoresistive (AMR) sensor to detect a magnetic field of the individual magnets. And then it calculates a rotation angle of the rotation body, by using such as a phase difference between each of detection signals for the rotation angles of the individual secondary rotation bodies that each of the AMR sensors outputs.

On the contrary, a conventional rotation angle detecting device as disclosed in a patent document 2 comprises a rotating plate to be rotated using a rotation body and a gear to be rotated with the number of rotation as larger than that of the rotating plate by using the rotation body or the rotating plate. Moreover, there is provided an encoder of absolute signal type at the rotating plate, and then a code signal is output as a rotation angle detection signal for the rotating plate, which is determined as one cycle for one rotation of the rotating plate by such the encoder. Further, there is provided a magnetic sensor that a magnet and a magnetoresistive element are used therefor at the gear, and then an analog signal is output as a rotation angle detection signal for the gear, which is determined as one cycle for one rotation of the gear by such the magnetic sensor. Furthermore, a rotation angle of the rotation body is calculated, by a combination of each of the rotation angle detection signals to be output from such the encoder and the magnetic sensor individually.

[Patent Document 1] Japanese Patent Application Publication No. 2001-505667
[Patent Document 2] Japanese Patent Application Publication No. 2002-098522

DISCLOSURE OF THE INVENTION

Problems to be Solved by the Invention

However, there is a problem of low degree of freedom regarding designing according to the conventional rotation angle detection devices, because the phase difference between the detection signals is uniquely determined by such as a characteristic of the magnet to be provided in each of the secondary rotation bodies, a gear ratio, or the like, that are used for calculating the rotation angle of the rotation body. Moreover, there is a problem of becoming larger in size regarding a device according to the conventional rotation angle detection devices, because it becomes required to design larger for a diameter of a gear in a case of widening a range of a detection angle for a rotation angle of a detectable rotation body.

The present invention is presented with having regard to the above mentioned conventional problems, and an object is to provide a rotation angle detector to be able to realize a wide range of a detection angle therefor, with a high degree of freedom for designing thereof, without enlarging a device in size therefor.

Means for Solving the Problem

For solving the above mentioned subjects and achieving the object, a rotation angle detector according to the present invention is characterized in that the rotation angle detector is for detecting a rotation angle of a detectable rotation body, comprising: a primary rotation body to be attached to the detectable rotation body and to rotate as integral with the detectable rotation body; a secondary rotation body to rotate as a predetermined rotation ratio for the primary rotation body; a primary rotation detection mechanism to output a signal to be varied periodically as corresponding to a rotation of the primary rotation body; a secondary rotation detection mechanism to output a signal to be varied periodically as corresponding to a rotation of the secondary rotation body; a signal processing unit to calculate the rotation angles of the primary rotation body and the secondary rotation body using the signals that the primary rotation detection mechanism and the secondary rotation detection mechanism output; and an operation processing unit to calculate the rotation angle of the detectable rotation body, based on the calculated rotation angle of the primary rotation body or of the secondary rotation body, and on a relative rotation angle between the primary rotation body and the secondary rotation body, wherein at least any one of the following signals (A) to (D) is designed to have a cycle as different from one cycle for one rotation of the primary rotation body or of the secondary rotation body;

(A) an output signal of the primary rotation detection mechanism;
(B) an output signal of the secondary rotation detection mechanism;
(C) an input signal from the primary rotation detection mechanism to be processed at the signal processing unit; and
(D) an input signal from the secondary rotation detection mechanism to be processed at the signal processing unit.

Moreover, a rotation angle detector according to the present invention is characterized in that the rotation angle detector is for detecting a rotation angle of a detectable rotation body, comprising: a primary rotation body to be attached to the detectable rotation body and to rotate as integral with the detectable rotation body; a secondary rotation body to rotate as a predetermined rotation ratio for the primary rotation body; a primary rotation detection mechanism to output a signal to be varied periodically as corresponding to a rotation of the primary rotation body; a secondary rotation detection mechanism to output a signal to be varied periodically as corresponding to a rotation of the secondary rotation body; a signal processing unit to convert a cycle of the signals that the primary rotation detection mechanism and the secondary rotation detection mechanism output, and to calculate the rotation angles of the primary rotation body and the secondary rotation body regarding the converted cycle by using the signals; and an operation processing unit to calculate the rotation angle of the detectable rotation body, based on the calculated rotation angle of the primary rotation body or of the secondary rotation body, on a relative rotation angle between the primary rotation body and the secondary rotation body, and on the converted cycle.

Further, a rotation angle detector according to the present invention is characterized in that the rotation angle detector is for detecting a rotation angle of a detectable rotation body, comprising: a primary rotation body to be attached to the detectable rotation body and to rotate as integral with the detectable rotation body; a secondary rotation body to rotate as a predetermined rotation ratio for the primary rotation body; a primary rotation detection mechanism to output a continuous signal to be varied periodically as corresponding to a rotation of the primary rotation body; a secondary rotation detection mechanism to output a continuous signal to be varied periodically as corresponding to a rotation of the secondary rotation body; a signal processing unit to calculate the rotation angles of the primary rotation body and the secondary rotation body using the signals that the primary rotation detection mechanism and the secondary rotation detection mechanism output; and an operation processing unit to calculate the rotation angle of the detectable rotation body, based on the calculated rotation angle of the primary rotation body or of the secondary rotation body, on a relative rotation angle between the primary rotation body and the secondary rotation body, and on cycles of the signals that the primary rotation detection mechanism and the secondary rotation detection mechanism output.

Still further, a rotation angle detector according to the present invention is characterized in that the converted cycle regarding the above described invention is determined as a cycle to be a desirable value for an allowable error of the rotation angle for each of the primary rotation body or of the secondary rotation body, and for a range of a detection angle for the rotation angle of the detectable rotation body.

Still further, a rotation angle detector according to the present invention is characterized in that the operation processing unit regarding the above described invention calculates a rotation angle $\Phi$ of the detectable rotation body using the following equations (1) to (4), with assuming the calculated rotation angle of the primary rotation body as $\theta1$, an angle as $\theta2$ of which the calculated rotation angle of the secondary rotation body is multiplied by the predetermined rotation ratio, the converted cycle of the signal of the primary rotation detection mechanism as T1, a cycle as T2 (T1≠T2) of which the converted cycle of the signal of the secondary rotation detection mechanism is multiplied by the predetermined rotation ratio, an absolute value |T1−T2| as d for a difference between the cycle T1 and the T2;

in a case where T1<T2, and $\theta2 \leq \theta1$:

$\Phi = \theta1 + T1(\theta1 - \theta2)/d$ (1);

in a case where T1<T2, and $\theta2 > \theta1$:

$\Phi = \theta1 + T1(\theta1 - \theta2)/d + T1\ T2/d$ (2);

in a case where T1>T2, and $\theta1 \leq \theta2$:

$\Phi = \theta1 + T1(\theta2 - \theta1)/d$ (3); and in a case where T1>T2, and $\theta1 > \theta2$:

$\Phi = \theta1 + T1(\theta2 - \theta1)/d + T1\ T2/d$ (4).

Still further, a rotation angle detector according to the present invention is characterized in that the rotation angle detector is for detecting a rotation angle of a detectable rotation body, comprising: a primary rotation body to be attached to the detectable rotation body and to rotate as integral with the detectable rotation body; a secondary rotation body to rotate as a predetermined rotation ratio for the primary rotation body; a primary rotation detection mechanism to output a continuous signal to be varied periodically as corresponding to a rotation of the primary rotation body, with a periodicity of n as an integer of not less than two for one rotation of the primary rotation body; a secondary rotation detection mechanism to output a continuous signal to be varied periodically as corresponding to a rotation of the secondary rotation body, with a periodicity of m as an integer of less than n but not less than one for one rotation of the secondary rotation body; a signal processing unit to calculate the rotation angles of the primary rotation body and the secondary rotation body using the signals that the primary rotation detection mechanism and the secondary rotation detection mechanism output; and an operation processing unit to calculate the rotation angle of the detectable rotation body, based on the calculated rotation angle of the primary rotation body or of the secondary rotation body, on a relative rotation angle between the primary rotation body and the secondary rotation body, and on cycles of the signals that the primary rotation detection mechanism and the secondary rotation detection mechanism output.

Still further, a rotation angle detector according to the present invention is characterized in that the m regarding the above described invention is one.

Still further, a rotation angle detector according to the present invention is characterized in that the primary rotation detection mechanism or the secondary rotation detection mechanism regarding the above described invention comprises: a magnet to be attached to the primary rotation body or to the secondary rotation body for generating a magnetic field of which intensity is varied continuously and periodically in a rotation direction thereof; and two of magnetic detection elements to be arranged for having a predetermined angle around a center of rotation for the primary rotation body or for the secondary rotation body in a vicinity of the magnet.

Still further, a rotation angle detector according to the present invention is characterized in that the magnetic detection element regarding the above described invention is a Hall element.

Furthermore, a rotation angle detector according to the present invention is characterized in that the magnetic detection element regarding the above described invention is a magnetoresistive element.

EFFECT OF THE INVENTION

According to the present invention, it becomes able to obtain an advantage that it becomes able to realize a rotation angle detector to be able to realize a wide range of a detection angle therefor, with a high degree of freedom for designing thereof, without enlarging a device in size therefor.

FIG. 6 is a drawing showing a cycle T2, a gear ratio and an allowable error in a case where a cycle T1 is varied in a variety thereof regarding a range of a detection angle R as 1800 degrees according to the first embodiment.

DESCRIPTION OF THE REFERENCE SYMBOLS 1, 101 ROTATION ANGLE DETECTOR
2, 102 PRIMARY GEAR
3, 103 SECONDARY GEAR
4, 104 PRIMARY ROTATION DETECTION MECHANISM
4a, 104a RING SHAPED MAGNET
4b, 4c, 104b, 104c HALL ELEMENT
5, 7, 105, 107 SIGNAL PROCESSING UNIT
6, 106 SECONDARY ROTATION DETECTION MECHANISM
6a, 106a DISK SHAPED MAGNET
6b, 6c, 106b, 106c HALL ELEMENT
8, 108 OPERATION PROCESSING UNIT
9, 109 HOUSING
A1 to A6, A101 to A106 AMPLIFIER
L1 to L12, L101 to L112 CURVED LINE
X STEERING SHAFT

BEST MODE FOR CARRYING OUT THE INVENTION

An embodiment regarding a rotation angle detector according to the present invention will be described in detail below, with reference to the drawings. Here, according to the present embodiment, the present invention is not limited thereto.

The embodiment according to the present invention to be embodied as below is a rotation angle detector for detecting a rotation angle of a detectable rotation body which is characterized in that comprises: a primary rotation body to be attached to the detectable rotation body and to rotate as integral with the detectable rotation body; a secondary rotation body to rotate as a predetermined rotation ratio for the primary rotation body; a primary rotation detection mechanism to output a signal to be varied periodically as corresponding to a rotation of the primary rotation body; a secondary rotation detection mechanism to output a signal to be varied periodically as corresponding to a rotation of the secondary rotation body; a signal processing unit to calculate the rotation angles of the primary rotation body and the secondary rotation body using the signals that the primary rotation detection mechanism and the secondary rotation detection mechanism output; and an operation processing unit to calculate the rotation angle of the detectable rotation body, based on the calculated rotation angle of the primary rotation body or of the secondary rotation body, and on a relative rotation angle between the primary rotation body and the secondary rotation body, wherein at least any one of the following signals (A) to (D) is designed to have a cycle as different from one cycle for one rotation of the primary rotation body or of the secondary rotation body;

(A) an output signal of the primary rotation detection mechanism;

(B) an output signal of the secondary rotation detection mechanism;

(C) an input signal from the primary rotation detection mechanism to be processed at the signal processing unit; and (D) an input signal from the secondary rotation detection mechanism to be processed at the signal processing unit.

The First Embodiment

Figure 1:
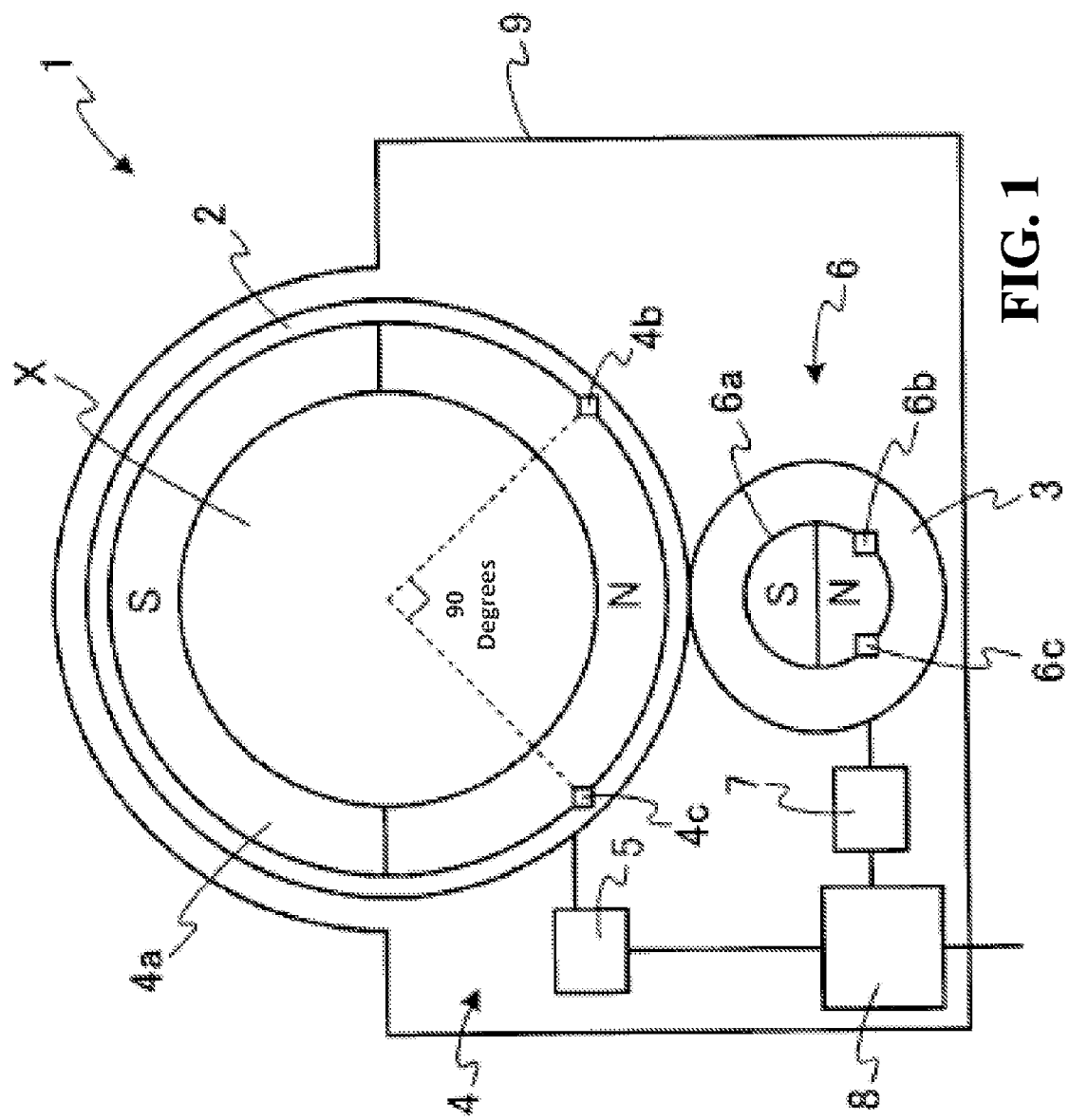
FIG. 1 is a cross sectional schematic diagram showing exemplary a rotation angle detector according to the first embodiment regarding the present invention.

FIG. 1 is a cross sectional schematic diagram showing exemplary a rotation angle detector according to the first embodiment regarding the present invention. Such the rotation angle detector according to the first embodiment is for detecting a rotation angle of a steering shaft in an automobile as a detectable rotation body.

Here, the rotation angle detector according to the first embodiment is one example that:

(C) an input signal from the primary rotation detection mechanism to be processed at the signal processing unit; and (D) an input signal from the secondary rotation detection mechanism to be processed at the signal processing unit are designed to have a cycle as different from one cycle for one rotation of the primary rotation body or of the secondary rotation body, among the above mentioned signals of (A) to (D).

As shown in FIG. 1, a rotation angle detector 1 comprises: a primary gear 2 of ring shape as a primary rotation body that a steering shaft X as extended in a vertical direction to the page is attached and fixed by engaging in a hole at a central part thereof and rotates as integral with the steering shaft X; a secondary gear 3 as a secondary rotation body to mesh with the primary gear 2 and to rotate as a predetermined rotation ratio for the primary gear 2; a primary rotation detection mechanism 4 to output a signal to be varied periodically as corresponding to a rotation of the primary gear 2; a signal processing unit 5 to convert a cycle of the signal that the primary rotation detection mechanism 4 outputs and to calculate a rotation angle of the primary gear 2 using such the signal; a secondary rotation detection mechanism 6 to output a signal to be varied periodically as corresponding to a rotation of the secondary gear 3; a signal processing unit 7 to convert a cycle of the signal that the secondary rotation detection mechanism 6 outputs and to calculate a rotation angle of the secondary gear 3 using such the signal; and an operation processing unit 8 to calculate a rotation angle of the steering shaft X, based on the calculated rotation angles of the primary gear 2 and the secondary gear 3 that the signal processing units 5 and 7 calculate respectively, on a relative rotation angle between the primary gear 2 and the secondary gear 3, and on a converted cycle thereof. Here, a gear ratio between the primary gear 2 and the secondary gear 3, that is to say, the rotation ratio is 5/9. Moreover, a symbol 9 designates a housing of the rotation angle detector 1.

Further, the primary rotation detection mechanism 4 comprises: a magnet 4a of ring shape to be attached at the primary gear 2; and Hall elements 4b and 4c to be arranged at a position with a distance of 0.5 mm for each thereof from a surface of the ring shaped magnet 4a for having an angle of 90 degrees therebetween around a rotation center of the primary gear 2. As similar thereto, the secondary rotation detection mechanism 6 comprises: a magnet 6a of disk shape to be attached at the secondary gear 3; and Hall elements 6b and 6c to be arranged at a position with a distance of 0.5 mm for each thereof from a surface of the disk shaped magnet 6a for having an angle of 90 degrees therebetween around a rotation center of the secondary gear 3. Still further, the Hall elements 4b, 4c, 6b and 6c are fixed to the rotation angle detector 1.

Still further, the ring shaped magnet 4a is a dipoles magnet that a part of a south pole thereof and a part of a north pole thereof are alternately arranged for one part by one part, and is magnetized for generating a magnetic field that an intensity thereof is varied continuously and periodically as a sine wave shape in a rotation direction of the primary gear 2. Still further, the Hall elements 4b and 4c detect the magnetic field that the intensity thereof is varied corresponding to the rotation of the primary gear 2, and then individually outputs a voltage signal corresponding to the intensity of the magnetic field. Still further, a cycle for a variation regarding the intensity of the magnetic field, that is to say, the cycle of the voltage signal that the Hall elements 4b and 4c individually outputs, is 360 degrees. As similar thereto, the disk shaped magnet 6a is a dipoles magnet that a part of a south pole thereof and a part of a north pole thereof are alternately arranged for one part by one part, and is magnetized for generating a magnetic field that an intensity thereof is varied continuously and periodically as a sine wave shape in a rotation direction of the secondary gear 3. Furthermore, the Hall elements 6b and 6c detect the magnetic field that the intensity thereof is varied corresponding to the rotation of the secondary gear 3, and then individually outputs a voltage signal corresponding to the intensity of the magnetic field of which cycle is 360 degrees respectively.

Figure 2:
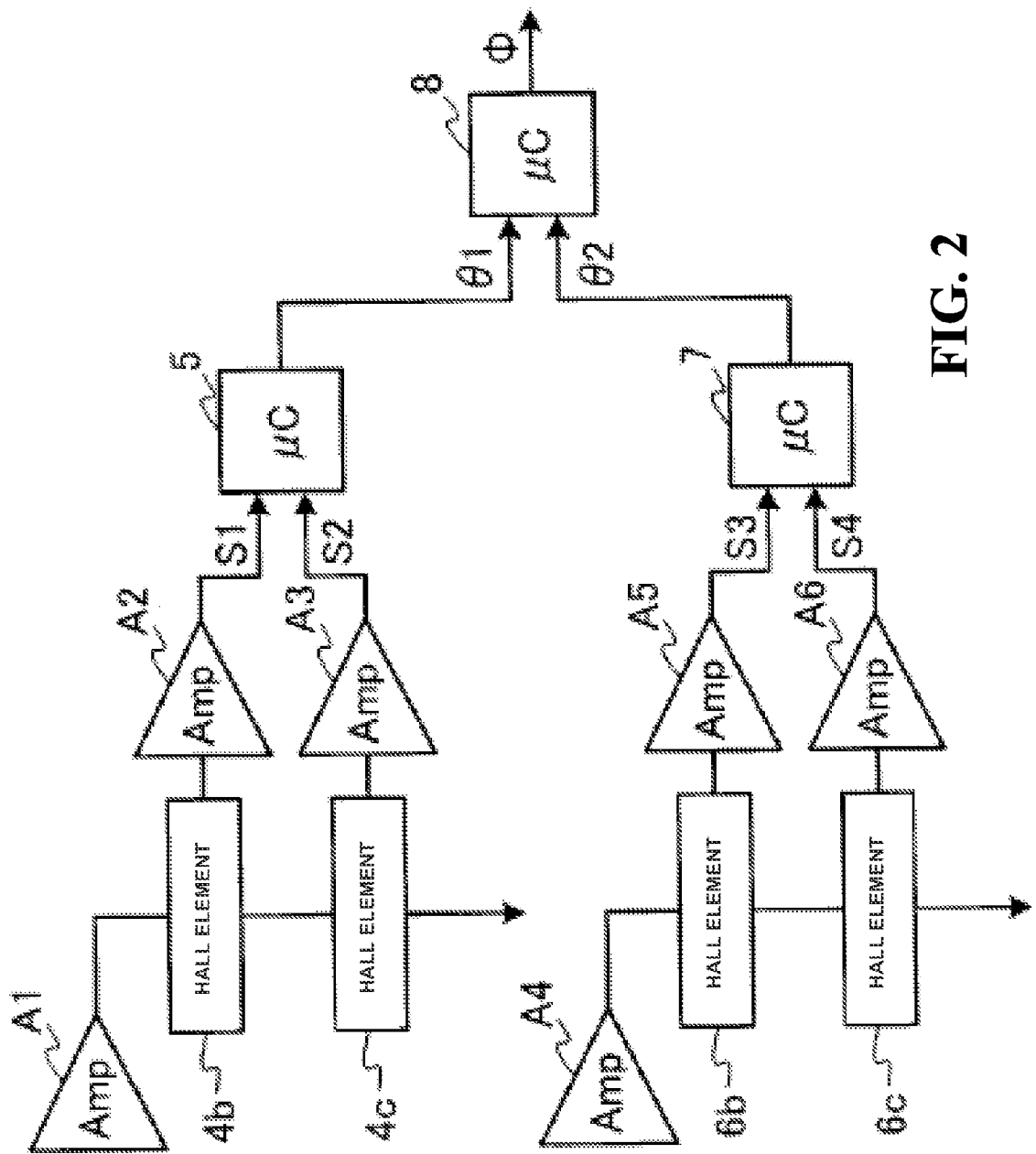
FIG. 2 is a block diagram showing a configuration of a primary rotation detection mechanism, a secondary rotation detection mechanism, a signal processing unit and an operation processing unit as shown in FIG. 1.

FIG. 2 is a block diagram showing a configuration of the primary rotation detection mechanism 4, the secondary rotation detection mechanism 6, the signal processing unit 5 and 7, and the operation processing unit 8, as shown in FIG. 1. Moreover, regarding the Hall elements 4b and 4c, a voltage is applied thereto which is amplified by using an amplifier A1, that detect the magnetic field of the intensity corresponding to the rotation of the primary gear 2, and then output the voltage signals individually having a value of a voltage corresponding to the intensity of the magnetic field to be detected. Further, amplifiers A2 and A3 amplify the voltage signals that the Hall elements 4b and 4c output, and then output S1 and S2 as values of the voltage to the signal processing unit 5 which comprises a microcontroller. Furthermore, the signal processing unit 5 obtains the voltage signal, performs an A/D conversion therefor, converts the cycle of the voltage signal, calculates θ1 as the rotation angle of the primary gear 2 for a cycle after the conversion, with using the values of voltage S1 and S2, and then outputs it to the operation processing unit 8 which comprises a microcontroller.

As similar thereto, the Hall elements 6b and 6c to be applied a voltage, which is amplified by using an amplifier A4, output voltage signals individually having a value of voltage corresponding to an intensity of the magnetic field to be detected thereby. Moreover, the amplifiers A5 and A6 amplify the voltage signals that the Hall elements 6b and 6c output, and then output S3 and S4 as values of the voltage to the signal processing unit 7 which comprises a microcontroller. Further, the signal processing unit 7 obtains the voltage signal, performs an A/D conversion therefor, converts the cycle of the voltage signal, calculates a rotation angle of the secondary gear 3 for a cycle after the conversion using the values of voltage S3 and S4, calculates θ2 as an angle that such the rotation angle is multiplied by the rotation ratio of 5/9, and then outputs it to the operation processing unit 8. Furthermore, the operation processing unit 8 calculates a rotation angle Φ of the steering shaft X with using the θ1 and the θ2.

Next, a method for detecting a rotation angle of the steering shaft X by using the rotation angle detector 1 will be described in detail below, with reference to FIGS. 3 to 5. First, a method for calculating a rotation angle of the primary gear 2 will be described in detail below, with reference to FIG. 3. Here, the S1 and the S2 as the values of voltage for the voltage signals to be input into the signal processing unit 5 correspond to each one point on sine curved lines L1 and L2 respectively, that have cycles of 360 degrees as shown in such as a graph at an upper stage in FIG. 3 respectively. Here, regarding such the graph, a horizontal axis therein indicates a rotation angle of the primary gear 2 based on an arbitral position therefor, and a vertical axis therein indicates a voltage of the voltage signal. Moreover, the Hall element 4b and 4c are arranged to have the angle of 90 degrees therebetween around the rotation center of the primary gear 2, and then a phase difference of the sine curved lines L1 and the L2 becomes to be 90 degrees.

Next, the signal processing unit 5 normalizes the values of voltage S1 and the S2 by using the following equations (5) and (6). Here, values to be normalized are assumed as M1 and M2; and $$M1=(S1-S1avg)/S1p \quad (5),$$

$$M2=(S2-S2avg)/S2p \quad (6).$$

Here, the S1avg and the S2avg are average values of the maximum value and the minimum value regarding one cycle of the voltage signal respectively, and the S1p and the S2p are differences between the maximum value and the minimum value regarding the one cycle of the voltage signal respectively. Moreover, regarding the S1avg, the S2avg, the S1p and the S2p, data of the voltage signals are obtained by rotating the primary gear 2 as one rotation at a time of assembling and adjusting the rotation angle detector 1, each of such the values are evaluated using such the data, and then those are memorized in the signal processing unit 5. Further, the normalized values M1 and the M2 to be evaluated in the above mentioned way individually correspond to each one point on the sine curved lines L3 and the L4 having the cycles of 360 degrees respectively, as shown in a graph at a middle stage in FIG. 3. Here, regarding such the graph, a horizontal axis therein indicates a rotation angle of the primary gear 2 based on an arbitral position therefor, and a vertical axis therein indicates a normalized value.

Next, the signal processing unit 5 converts the cycle of the voltage signal from 360 degrees to 180 degrees. As assuming a converted cycle to be T1, T1=180 degrees. And then the signal processing unit 5 calculates a θ1 as the rotation angle of the primary gear 2 at such the converted cycle T1 by using the normalized values M1 and the M2. Here, it is able to calculate the θ1 as below for example.

First, the θ is calculated by using equation (7).

$$\theta = \text{Arctan}(M1/M2) + \alpha \qquad (7).$$

Here, α=90 degrees in a case where M2>0, α=270 degrees in a case where M2<0, meanwhile, θ=180 degrees in a case where M2=0 and M1>0, and θ=0 degree in a case where M2=0 and M1<0.

And then it is assumed that θ1=θ if the θ is not larger than 180 degrees, meanwhile, θ1=θ−180 if the θ is larger than 180 degrees. Moreover, it converts the cycle of 360 degrees to be the cycle of 180 degrees as a half thereof.

Figure 3:
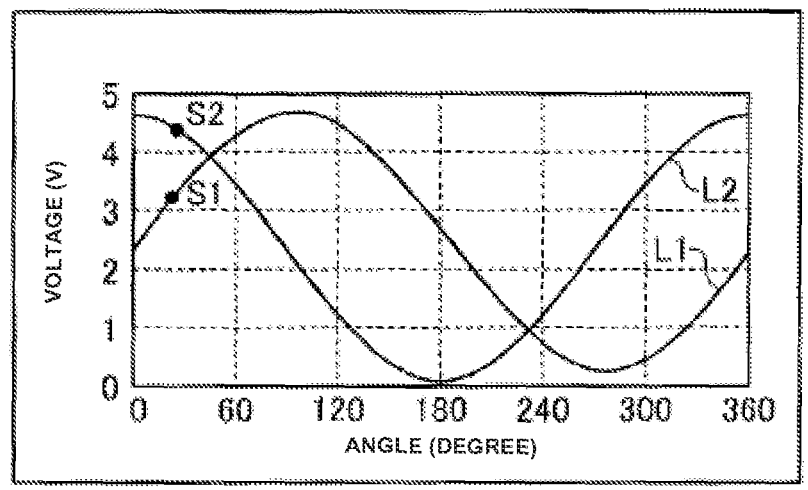
FIG. 3 is a graph explaining a method for calculating a rotation angle of a primary gear regarding a rotation angle detector according to the first embodiment.
Figure 3:
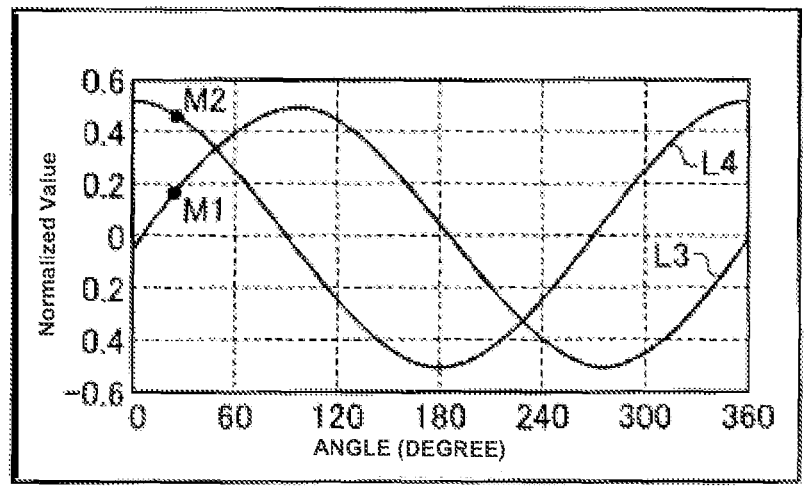
Figure 3:
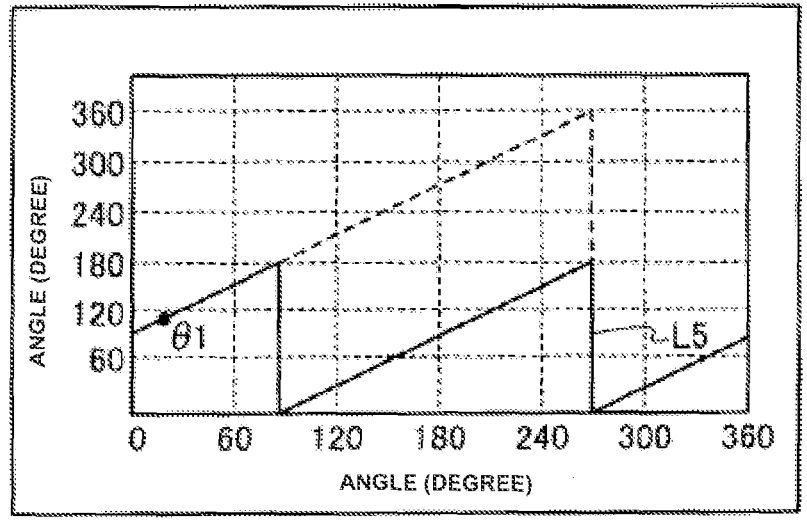

According to the above mentioned method, the calculated angle θ1 corresponds to the one point on a curved line of sawtooth shape L5 having a cycle of 180 degrees as shown in a graph at a lower stage in FIG. 3. Here, regarding such the graph, a horizontal axis therein indicates a rotation angle of the primary gear 2 based on an arbitral position therefor, and a vertical axis therein indicates a calculated rotation angle of the primary gear 2.

Next, a method for calculating a rotation angle of the secondary gear 3 will be described in detail below, however, such the method is almost similar to the method for calculating the rotation angle of the primary gear 2. The S3 and the S4 as the values of voltage for the voltage signals to be input into the signal processing unit 7 individually correspond to each one point on sine curved lines L6 and L7 respectively, that have cycles of 360 degrees as shown in such as a graph at an upper stage in FIG. 4 respectively. Here, regarding such the graph, a horizontal axis therein indicates a rotation angle of the secondary gear 3 based on an arbitral position therefor, and a vertical axis therein indicates a voltage of the voltage signal. Moreover, a phase difference of the sine curved lines L6 and the L7 is 90 degrees.

Next, the signal processing unit 7 normalizes the voltage signals S3 and the S4 to be as M3 and M4 respectively, by using the following equations (8) and (9).

$$M3 = (S3 - S3avg)/S3p \qquad (8),$$

$$M4 = (S4 - S4avg)/S4p \qquad (9).$$

Here, the S3avg and the S4avg are average values of the maximum value and the minimum value for the voltage signal respectively, and the S3p and the S4p are differences between the maximum value and the minimum value for the voltage signal respectively. Moreover, data of the voltage signals are obtained by rotating the secondary gear 3 as one rotation at a time of assembling and adjusting the rotation angle detector 1, each of such the values are evaluated using such the data, and then those are memorized in the signal processing unit 7. Further, the normalized values M3 and the M4 individually correspond to each one point on the sine curved lines L8 and the L9 having the cycles of 360 degrees respectively, as shown in a graph at a middle stage in FIG. 4. Here, regarding such the graph, a horizontal axis therein indicates a rotation angle of the secondary gear 3 based on an arbitral position therefor, and a vertical axis therein indicates a normalized value.

Next, the signal processing unit 7 converts the cycle of the voltage signal from 360 degrees to 360 degrees, and then multiplies the gear ratio of 5/9. That is to say, as assuming a cycle to be as T2, that the converted cycle is multiplied by the gear ratio, T2=360 5/9=200 degrees. Thus, according to the present invention, a conversion of a cycle of a signal includes a case of converting a cycle thereof to be as similar to the cycle of itself.

Moreover, the signal processing unit 7 calculates a rotation angle of the secondary gear 3 at the cycle T2 by using the normalized values M3 and the M4, and then calculates a θ2 as an angle that the rotation angle is multiplied by the gear ratio. Here, it is able to calculate the θ2 as below for example.

First, the θ is calculated by using an equation (10).

$$\theta = \text{Arctan}(M3/M4) + \alpha \qquad (10).$$

Here, α=90 degrees in a case where M4>0, α=270 degrees in a case where M4<0, meanwhile, θ=180 degrees in a case where M4=0 and M3>0, and θ=0 degree in a case where M4=0 and M3<0.

And then it calculates the θ2 using the θ to be multiplied by the gear ratio of 5/9.

Figure 4:
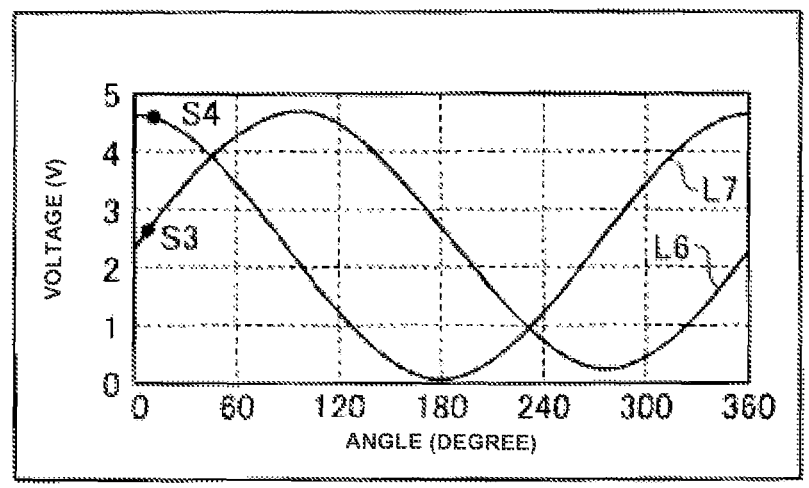
FIG. 4 is a graph explaining a method for calculating a rotation angle of a secondary gear regarding a rotation angle detector according to the first embodiment.
Figure 4:
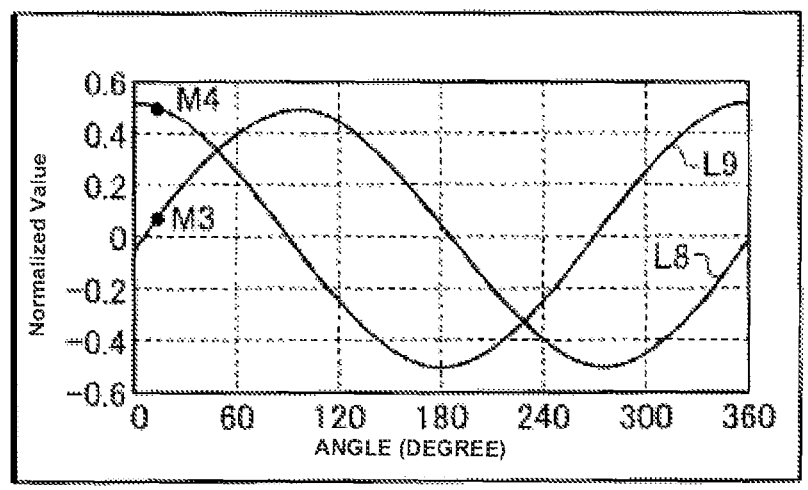
Figure 4:
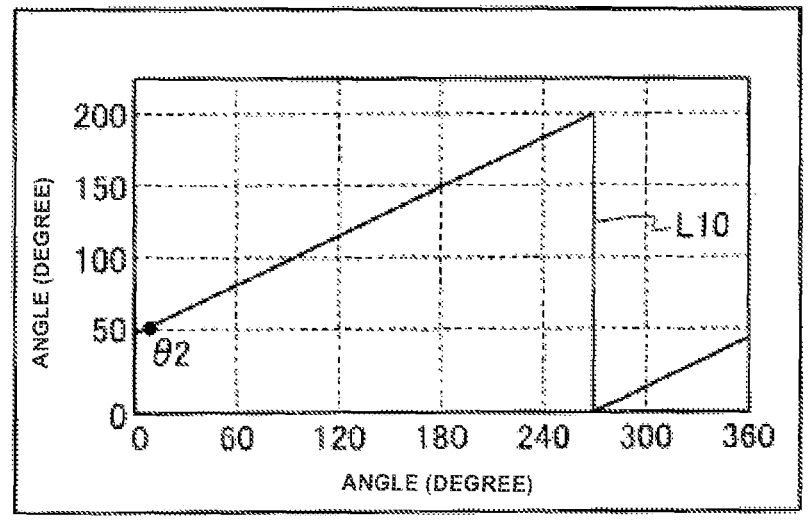

According to the above mentioned method, the calculated angle θ2 corresponds to the one point on a curved line of sawtooth shape L10 having a cycle of 200 degrees as shown in a graph at a lower stage in FIG. 4. Here, regarding such the graph, a horizontal axis therein indicates a rotation angle of the secondary gear 3 based on an arbitral position therefor, and a vertical axis therein indicates an angle that the calculated rotation angle of the secondary gear 3 is multiplied by the gear ratio.

Next, the signal processing units 5 and 7 individually outputs the angles θ1 and the θ2 to the operation processing unit 8 respectively, which is evaluated as mentioned above. Here, according to the rotation angle detector 1 regarding the first embodiment, as T1=180 degrees and T2=200 degrees as mentioned above, the operation processing unit 8 calculates Φ as the rotation angle of the steering shaft X, with assuming an absolute value as d=|T1−T2| for a difference of the cycles between the cycle T1 and the T2, and by using the equations (1) and (2).

In a case where θ2≦θ1:

$$\Phi = \theta 1 + T1(\theta 1 - \theta 2)/d \qquad (1),$$

In a case where θ2>θ1:

$$\Phi = \theta 1 + T1(\theta 1 - \theta 2)/d + T1\ T2/d \qquad (2).$$

Next, in the case where θ2≦θ1, relations among the angles θ1 and the θ2, the cycles T1 and the T2, the difference of the cycles d, and the rotation angle Φ will be described in detail below, with reference to FIG. 5. Here, a horizontal axis in FIG. 5 indicates a range of a detection angle R=T1 T2/|T1−T2|=1800 degrees regarding the rotation angle of the steering shaft X. Moreover, a curved line L11 of sawtooth shape is the curved line L5 of sawtooth shape in FIG. 3 to be arranged as ten cycles within the range of the detection angle R, wherein a vertical axis therein indicates a ratio for the one cycle thereof, and the ratio becomes to be 100% in a case where the angle is 180 degrees. While, a curved line L12 of sawtooth shape is the curved line L10 of sawtooth shape in FIG. 4 to be arranged as nine cycles within the range of the detection angle R, wherein a vertical axis therein indicates a ratio for the one cycle thereof, and the ratio is designed to be 100% in a case where the angle is 200 degrees. Further, regarding the rotation angle Φ, it is designed for a position thereof to be zero degree where a phase of the curved line L11 of sawtooth shape and of the L12 correspond to each other. In such a case, even at a position where Φ is 1800 degrees, the phase of the curved line L11 of sawtooth shape and of the L12 correspond to each other.

Figure 5:
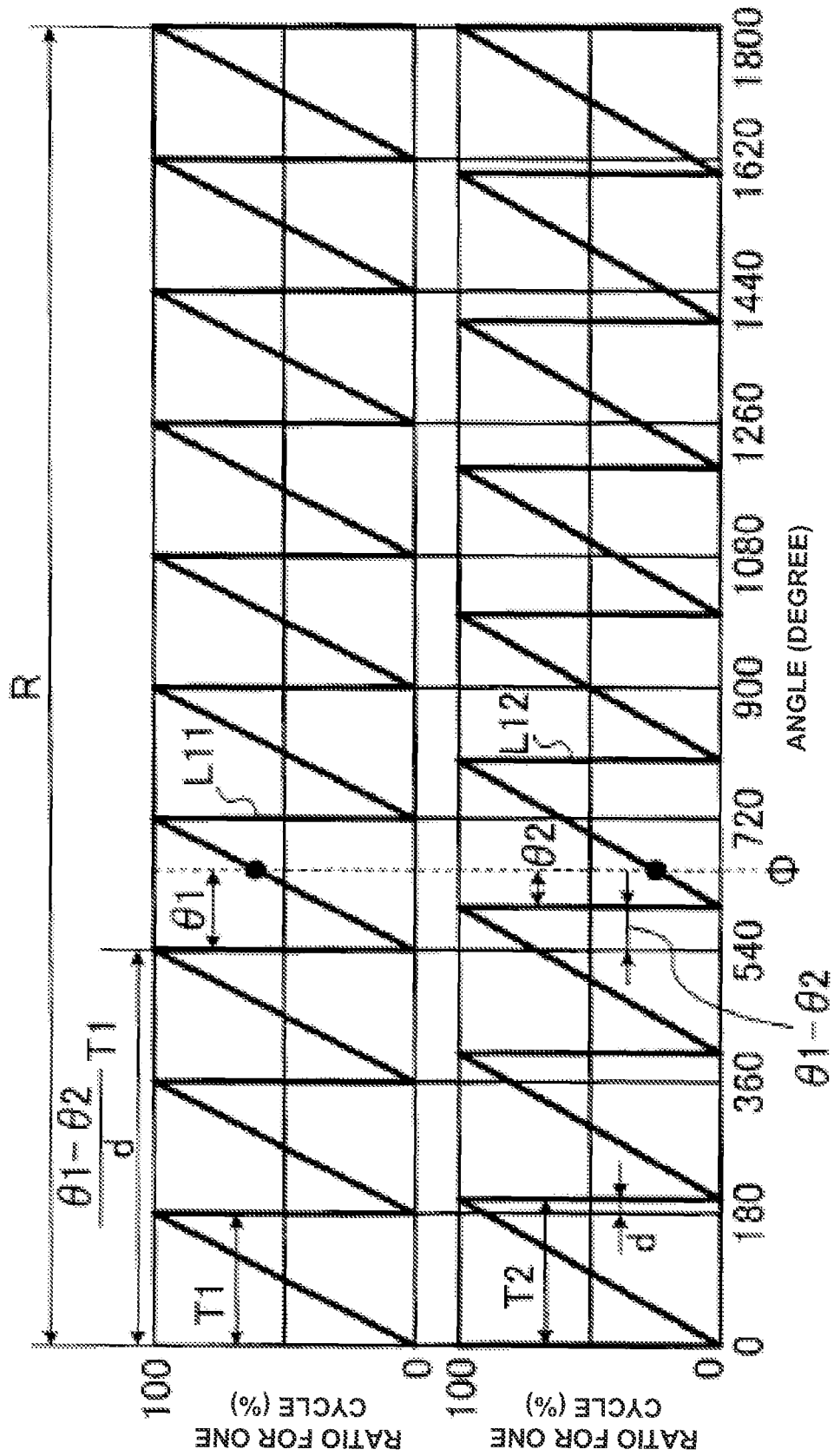
FIG. 5 is a graph explaining relations among angles θ1 and θ2, cycles T1 and T2, a difference of cycles d, and a rotation angle Φ in a case where θ2≦θ1 according to the first embodiment.

Here for example, the angle θ1 and the θ2 are assumed to be calculated individually regarding the primary gear 2 and the secondary gear 3 as shown in FIG. 5. While, the rotation angle Φ is assumed to be calculated by using the equation (1). In such a case, (θ1−θ2) as a relative rotation angle between the primary gear 2 and the secondary gear 3 means a shift of the phases between the curved line L11 of sawtooth shape and the L12. Moreover, because the curved line L11 of sawtooth shape and the L12 have the phases with the shift as the difference of the cycles d for every rotation of the one cycle of the primary gear 2, (θ1−θ2)/d has a value of integer, that is an equation meaning whether the rotation angle Φ includes rotations for how many times of cycles for the primary gear. More specifically, because the cycle T1 and the T2 regarding the primary gear 2 and the secondary gear 3 are 180 degrees and 200 degrees respectively, the d becomes equal to 20 degrees. That is to say, in a case where the primary gear 2 rotates as one cycle, the phase becomes to be shifted as 20 degrees for between the phase of the curved line L11 of sawtooth shape and of the L12. According to FIG. 5, because the rotation angle Φ is the value that the primary gear further rotates as the angle of θ1 from a state that rotates as three cycles, (θ1−θ2)/d=3. Thus, the angles θ1 and the θ2, the cycles T1 and the T2, the difference of the cycles d, and the rotation angle Φ have the above mentioned relations, and then it becomes able to calculate the rotation angle Φ by using the equation (1).

On the contrary, in the case where θ2>θ1, the rotation angle Φ means whether including rotations for how many times of cycles for the primary gear, and then an equation becomes to be as [T2−(θ2−θ1)/d] which has a value of integer. And then it becomes able to calculate the rotation angle Φ by using the equation (2).

Moreover, because the equation (1) and the following equation (1a), the equation (2) and the following equation (2a) are equivalent equations therebetween respectively, it may be able to calculate the rotation angle Φ by using the equation (1a) in place of the equation (1), or it may be able to calculate the rotation angle Φ by using the equation (2a) in place of the equation (2) as well.

$$\Phi = \theta 2 + T2(\theta 1 - \theta 2)/d \quad (1a),$$

$$\Phi = \theta 2 + T2(\theta 1 - \theta 2)/d + T1\ T2/d \quad (2a).$$

As described above, the range of the detection angle R is expressed as R=T1 T2/|T1−T2|. That is to say, the detection angle R is the least common denominator of the cycle T1 and the T2. And then it is required for the cycle T1 and the T2 to be determined as a desirable range of the detection angle R. Moreover, the difference of the cycles d is used for determining whether the rotation angle Φ includes rotations for how many cycles of the primary gear. And then an error to be allowed for detecting the angles θ1 and the θ2 is expressed by the difference of the cycles d. Further, such the allowable error is set to be a desirable value with corresponding to such as an assembly tolerance of a rotation angle detecting device, a temperature characteristic thereof, or the like. Therefore, it is required for the cycle T1 and the T2 to be determined as the desirable allowable error, that is to say, the difference of the cycles d.

However, according to the rotation angle detector 1 regarding the present invention, it becomes able to obtain the desirable cycle T1 and the T2 by converting the cycle of the voltage signal at the time of the signal processing therefor. Therefore, it becomes able to determine the cycle T1 and the T2 for the difference of the cycles d and for the range of the detection angle R to be the desirable values respectively. As a result, the range of the detection angle R and the difference of the cycles d become not to be fixed uniquely by such as the signal that the primary rotation detection mechanism 4 and the secondary rotation detection mechanism 6, the gear ratio, or the like, but it becomes able to set those in a high degree of freedom respectively.

As described above, the rotation angle detector 1 according to the first embodiment converts the cycle of the individual signals that the primary rotation detection mechanism 4 and the secondary rotation detection mechanism 6 output respectively, calculates the individual rotation angles of the primary gear 2 and the secondary gear 3 regarding the cycle to be converted by using such the signal, and then calculates the rotation angle of the steering shaft X, based on the calculated rotation angle, on the relative rotation angle between the primary gear 2 and the secondary gear 3, and on the cycle of the signal to be converted. As a result, it becomes able to design in a high degree of freedom respectively, regarding such as the primary rotation detection mechanism, the secondary rotation detection mechanism, the gear ratio between the primary gear and the secondary gear, or the like.

Moreover, because the rotation angle detector 1 uses the secondary gear as just one, the detection error of the rotation is not superimposed as an error for the rotation angle of the primary gear 2, which is generated between the secondary gear 3 and the primary gear 2 due to a backlash of the gears. And then it becomes able to detect the rotation angle of the steering shaft X as further accurately. Further, it becomes able to reduce the number of component parts comparing to that of the conventional rotation angle detecting device, and then it becomes to be the rotation angle detector of further small sized, with a lighter weight and a lower manufacturing cost therefor. Still further, because the rotation angle detector 1 uses the Hall element as the magnetic detection element, it becomes possible therefor to be as a further smaller in size, with a lighter weight and a lower manufacturing cost therefor.

Still further, regarding the rotation angle detector 1, the primary rotation detection mechanism and the secondary rotation detection mechanism are designed to output a continuous analog signal to be varied periodically corresponding to the rotation of the primary gear 2 or the secondary gear 3. Thus, it becomes able to design it smaller in size comparing to the case of the encoder to output the digital signal as disclosed in the patent document 2. Furthermore, it becomes able to perform the angle detection with a higher resolution comparing to the case of using a discrete digital signal, because of using the continuous analog signal in the case of performing the detection of the rotation angle of the primary gear 2 and the secondary gear 3.

Next, in a case where the range of the detection angle R is 1800 degrees according to the first embodiment, the T2, the gear ratio and the allowable error will be shown in FIG. 6, in a case of varying the T1 in a variety thereof. Here, the equations (1) and (2) are used in the case of calculating the rotation angle Φ of the steering shaft X, because T1<T2 according to the first embodiment. However, in a case where T1>T2 due to the conversion of the cycle for the voltage signal, the rotation angle is calculated by using the following equations (3) and (4).

In a case where θ1≦θ2:

$$\Phi = \theta 1 + T1(\theta 2 - \theta 1)/d \quad (3);\ \text{and}$$

in a case where θ1>θ2:

$$\Phi = \theta 1 + T1(\theta 2 - \theta 1)/d + T1\ T2/d \quad (4).$$

In FIG. 6, the number of items [1] to [6] correspond to a case where the cycle T1 is 360/n (n is any integer of one to six) respectively. Here, because R=T1 T2/|T1−T2|, there are existed two of the T2 to be as T1<T2 or T1>T2 corresponding to each of the T1 for satisfying R=1800. And then the gear ratio k=m T2/360 and the allowable error become to be determined for each of the T2. Here, m is the value that 360 is divided by the cycle of the signal of the secondary rotation detection mechanism. And it is assumed that m=1 according to FIG. 6.

Regarding the gear ratio, it becomes able to design the secondary gear as smaller in a case where it is smaller, and then it is desirable thereby because it becomes able to realize a smaller in size and a lighter weight regarding the device. While, in a case where the allowable error is larger, it is desirable because an allowable amount becomes larger regarding the detection error of the angles θ1 and the θ2 due to the assembly tolerance of the device or the temperature characteristic thereof. As shown in FIG. 6, there is a trade off relation between the gear ratio and the allowable error. However, according to the rotation angle detector 1 regarding the first embodiment, it becomes able to design the optimum values for the gear ratio and the allowable error respectively, by converting the cycle of the signals of the primary rotation detection mechanism and the secondary rotation detection mechanism.

Here, according to the first embodiment, there is used the Hall element as the magnetic detection element, however, it may be also available to use a magnetoresistive element depend on the usage of the rotation angle detector, that has a temperature dependency as lower and has a higher angle resolution.

Moreover, according to the first embodiment, regarding the output signal of the primary rotation detection mechanism 4 and the output signal of the secondary rotation detection mechanism 6, it is designed to have one cycle for the one rotation of the primary gear 2 and of the secondary gear 3 respectively. However, it may be also available to design therefor to have a different cycle therefrom respectively.

Figure 7:
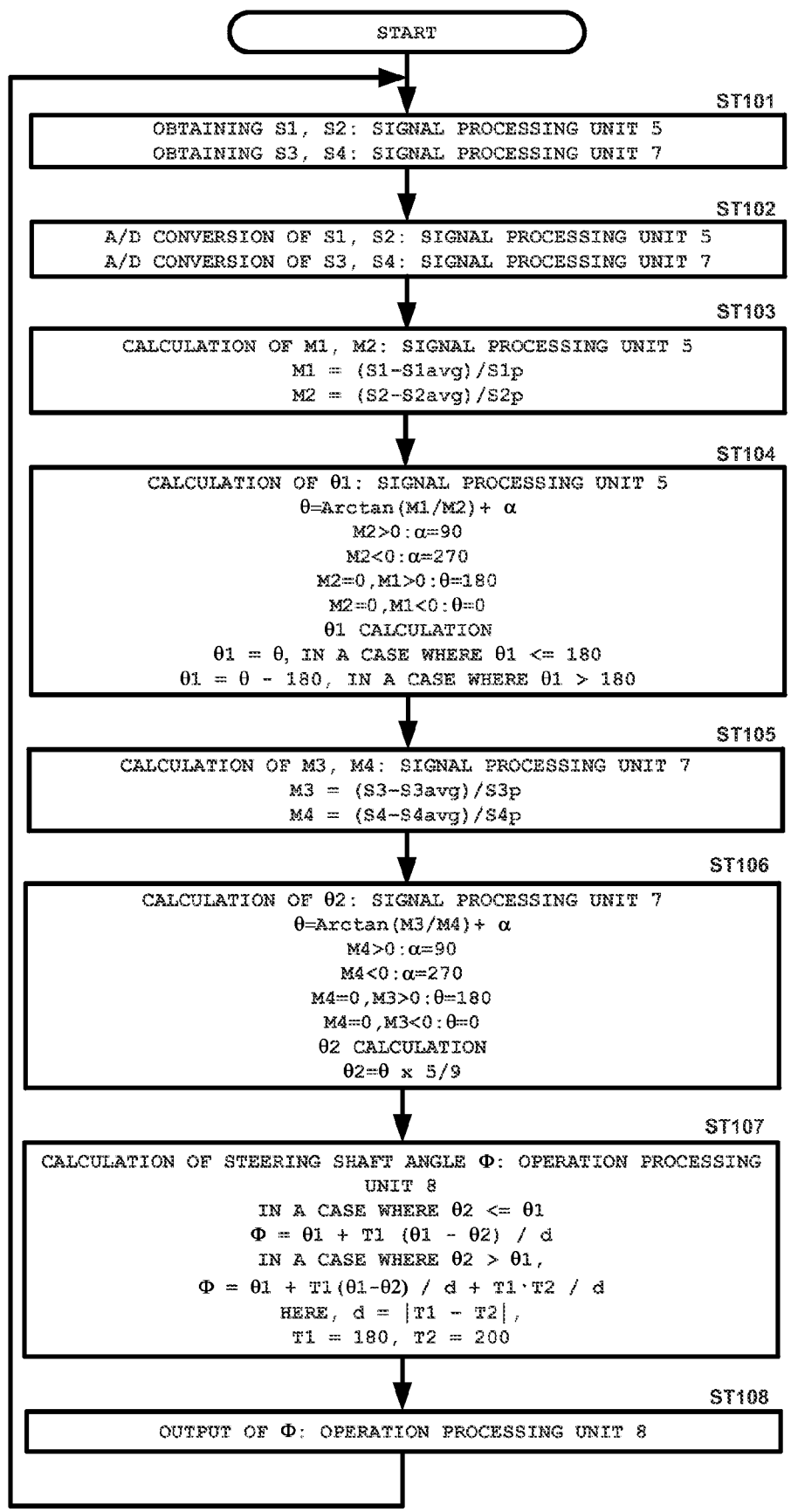
FIG. 7 is a flow diagram showing one example of a process flow for a rotation angle Φ of a steering shaft X to be calculated according to the first embodiment.

Here, according to the first embodiment, one example of a process flow for the rotation angle Φ of the steering shaft X to be calculated will be shown in FIG. 7. And, an equation or the like as shown in the flow diagram of FIG. 7 is the equation or the like as expressed in the first embodiment as described above. Moreover, the process flow as shown in FIG. 7 will be described in detail below. First, the signal processing unit 5 obtains the values of the voltage S1 and the S2, and also the signal processing unit 7 obtains the values of the voltage S3 and the S4 (a step ST101). Next, the signal processing unit 5 performs an A/D conversion for the values of the voltage S1 and the S2, and also the signal processing unit 7 performs an A/D conversion for the values of the voltage S3 and the S4 (a step ST102). Next, the signal processing unit 5 calculates the normalized values M1 and the M2 (a step ST103), and then calculates the angle θ1 (a step ST104). Next, the signal processing unit 7 calculates the normalized values M3 and the M4 (a step ST105), and then calculates the angle θ2 (a step ST106). Next, the operation processing unit 8 calculates the angle Φ (a step ST107), and then outputs the angle Φ (a step ST108). Further, it repeats the step ST101 thorough the step ST108 thereafter. Here, it is needless to say that the flow of the signal processing according to the first embodiment is not limited to such the process flow. Furthermore, for the second embodiment as described below, a processing as almost similar to the flow diagram of FIG. 7 is performed.

The Second Embodiment

Figure 8:
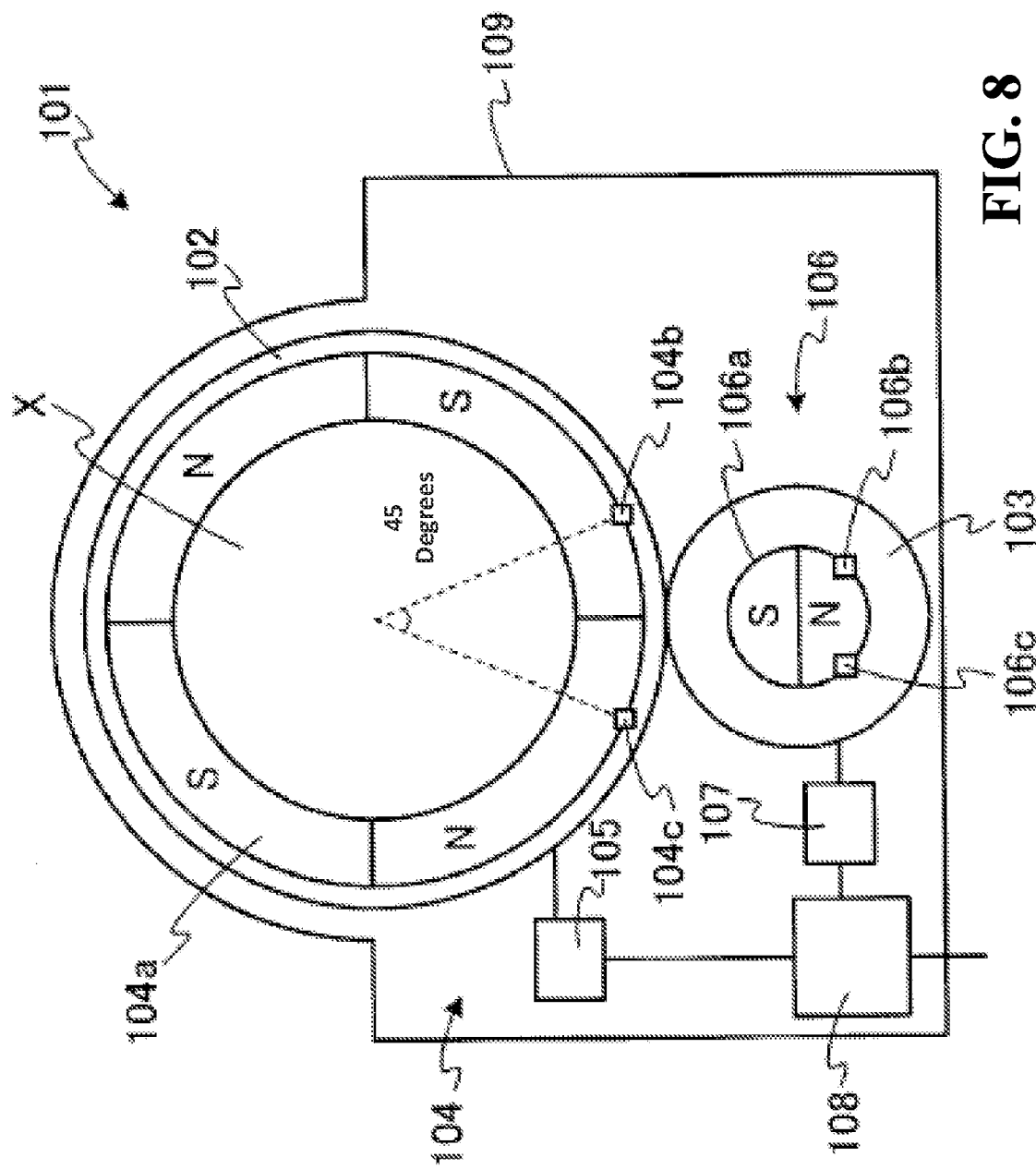
FIG. 8 is a cross sectional schematic diagram showing exemplary a rotation angle detector according to the second embodiment regarding the present invention.

FIG. 8 is a cross sectional schematic diagram showing exemplary a rotation angle detector according to the second embodiment regarding the present invention. Such the rotation angle detector according to the second embodiment is for detecting a rotation angle of a steering shaft in an automobile as a detectable rotation body, as similar to that according to the first embodiment.

Here, the rotation angle detector according to the second embodiment is one example, wherein at least either one of:

(A) an output signal of the primary rotation detection mechanism; or (B) an output signal of the secondary rotation detection mechanism, among the above mentioned signals (A) to (D) is designed to be as different from the one cycle for the one rotation of the primary rotation body or of the secondary rotation body.

As shown in FIG. 8, a rotation angle detector 101 comprises: a primary gear 102 of ring shape as a primary rotation body that a steering shaft X as extended in a vertical direction to the page is attached and fixed by engaging in a hole at a central part thereof and rotates as integral with the steering shaft X; a secondary gear 103 as a secondary rotation body to mesh with the primary gear 102 and to rotate as a predetermined rotation ratio for the primary gear 102; a primary rotation detection mechanism 104 to output a continuous signal to be varied periodically as corresponding to a rotation of the primary gear 102; a signal processing unit 105 to calculate a rotation angle of the primary gear 102 using the signal that the primary rotation detection mechanism 104 outputs; a secondary rotation detection mechanism 106 to output a continuous signal to be varied periodically as corresponding to a rotation of the secondary gear 103; a signal processing unit 107 to calculate a rotation angle of the secondary gear 103 using the signal that the secondary rotation detection mechanism 106 outputs; and an operation processing unit 108 to calculate a rotation angle of the steering shaft X, based on the calculated rotation angles of the primary gear 102 and the secondary gear 103 that the signal processing units 105 and 107 calculate respectively, on a relative rotation angle between the primary gear 102 and the secondary gear 103, and on the cycle of the signals that the primary rotation detection mechanism 104 and the secondary rotation detection mechanism 106 output respectively. Here, a gear ratio between the primary gear 102 and the secondary gear 103, that is to say, the rotation ratio is assumed to be as 5/9. Moreover, a symbol 109 designates a housing of the rotation angle detector 101.

Further, the primary rotation detection mechanism 104 comprises: a magnet 104a of ring shape to be attached at the primary gear 102; and Hall elements 104b and 104c to be arranged at a position with a distance of 0.5 mm for each thereof from a surface of the ring shaped magnet 104a for having an angle of 45 degrees therebetween around a rotation center of the primary gear 102. As similar thereto, the secondary rotation detection mechanism 106 comprises: a magnet 106a of disk shape to be attached at the secondary gear 103; and Hall elements 106b and 106c to be arranged at a position with a distance of 0.5 mm for each thereof from a surface of the disk shaped magnet 106a for having an angle of 90 degrees therebetween around a rotation center of the secondary gear 103. Still further, the Hall elements 104b, 104c, 106b and 106c are fixed to the rotation angle detector 101.

Still further, the ring shaped magnet 104a is a quadrupoles magnet that a part of a south pole thereof and a part of a north pole thereof are alternately arranged for two parts by two parts, and is magnetized for generating a magnetic field that an intensity thereof is varied continuously and periodically as a sine wave shape in a rotation direction of the primary gear 102, and that is designed to be generated as two cycles for one rotation thereof. Still further, the Hall elements 104b and 104c detect the magnetic field that the intensity thereof is varied corresponding to the rotation of the primary gear 102, and then individually outputs a voltage signal corresponding to the intensity of the magnetic field with two cycles for one rotation thereof, that is to say, with a periodicity as two. Still further, a cycle for a variation regarding the intensity of the magnetic field, that is to say, the cycle of the voltage signal that the Hall elements 104b and 104c individually outputs, is 180 degrees as a value that 360 degrees is divided by the periodicity of two. While, the disk shaped magnet 106a is a dipoles magnet that a part of a south pole thereof and a part of a north pole thereof are alternately arranged for one part by one part, and is magnetized for generating a magnetic field that an intensity thereof is varied continuously and periodically as a sine wave shape in a rotation direction of the secondary gear 103. Furthermore, the Hall elements 106b and 106c detect the magnetic field that the intensity thereof is varied corresponding to the rotation of the secondary gear 103, and then individually outputs a voltage signal with a periodicity as one, with corresponding to the intensity of the magnetic field respectively. That is to say, the individual cycles that the Hall elements 106b and 106c output is 360 degrees as a value that 360 degrees is divided by the periodicity of one.

Therefore, as assuming the periodicity of the continuous signal to be n, that the primary rotation detection mechanism 104 of the rotation angle detector 101 outputs, and as assuming the periodicity of the continuous signal to be m, that the secondary rotation detection mechanism 106 outputs, n=2, m=1. As described later, the smaller an absolute value of a difference between the cycle of the signal that the primary rotation detection mechanism 104 outputs and a cycle to be obtained by multiplying a gear ratio onto the cycle of the signal that the secondary rotation detection mechanism 106 outputs, the larger a range of a detection angle becomes, which is for the rotation of the shaft X of the rotation angle detector 101. Thus, the rotation angle detector 101 becomes to have the range of the detection angle as further wider.

Figure 9:
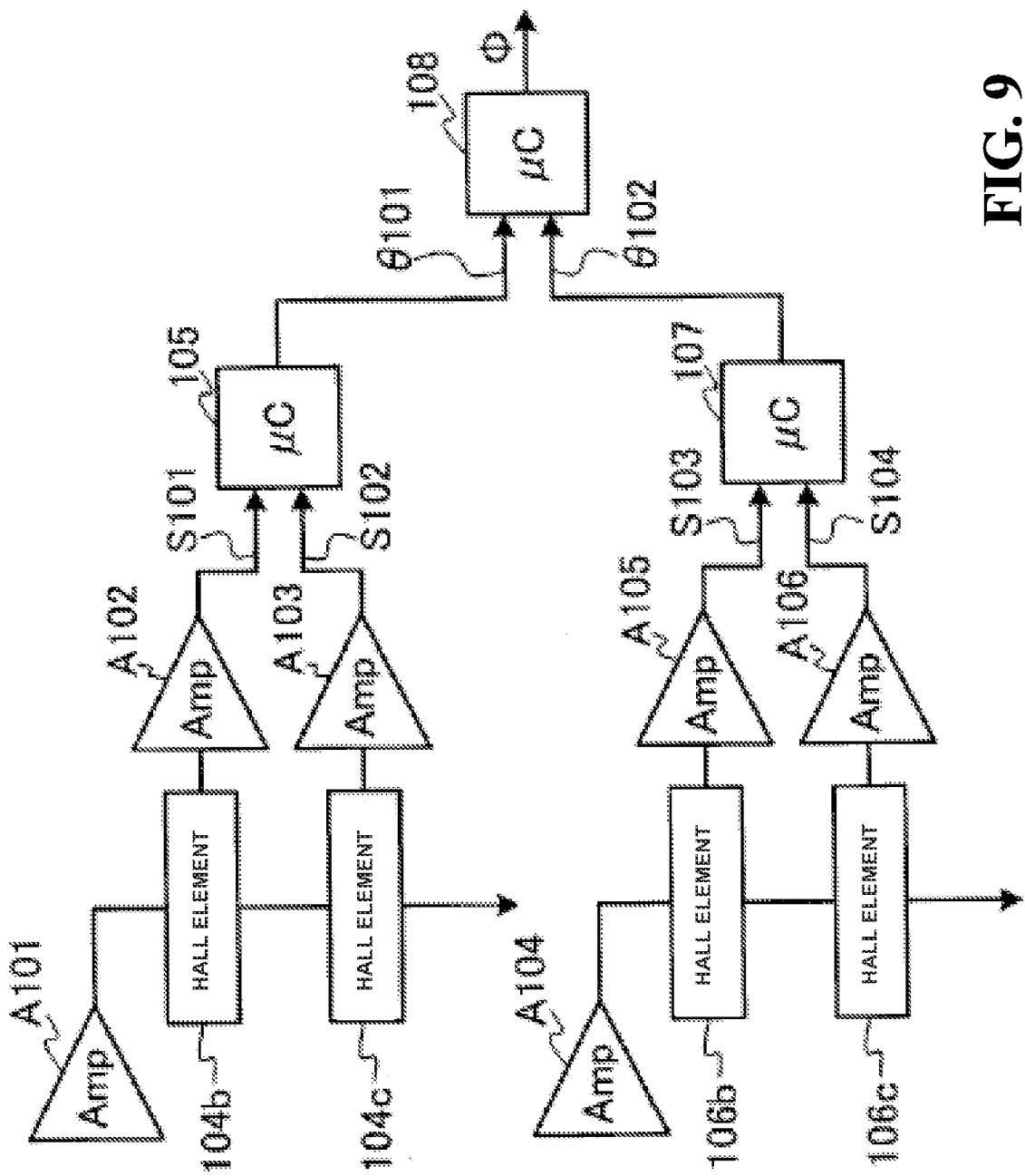
FIG. 9 is a block diagram showing a configuration of a primary rotation detection mechanism, a secondary rotation detection mechanism, a signal processing unit and an operation processing unit as shown in FIG. 8.

Next, such the rotation angle detector 101 will be further described in detail below. FIG. 9 is a block diagram showing a configuration of the primary rotation detection mechanism 104, the secondary rotation detection mechanism 106, the signal processing unit 105 and 107, and the operation processing unit 108, as shown in FIG. 8. Moreover, regarding the Hall elements 104b and 104c, a voltage is applied thereto which is amplified by using an amplifier A101, that detect the magnetic field of the intensity corresponding to the rotation of the primary gear 102, and then output the voltage signals individually having a value of a voltage corresponding to the intensity of the magnetic field to be detected. Further, amplifiers A102 and A103 amplify the voltage signals that the Hall elements 104b and 104c output respectively, determined therefor to be S101 and S102 as values of the voltage respectively, and then output to the signal processing unit 105 which comprises a microcontroller. Furthermore, the signal processing unit 105 obtains the voltage signal, performs an A/D conversion therefor, calculates a θ101 as the rotation angle of the primary gear 102 with using the values of voltage S101 and S102, and then outputs it to the operation processing unit 108 which comprises a microcontroller.

As similar thereto, the Hall elements 106b and 106c to be applied a voltage, which is amplified by using an amplifier A104, output voltage signals individually having a value of voltage corresponding to an intensity of the magnetic field to be detected thereby. Moreover, the amplifiers A105 and A106 amplify the voltage signals that the Hall elements 106b and 106c output respectively, determine those to be S103 and S104 as values of the voltage respectively, and then output those to the signal processing unit 107 which comprises a microcontroller. Further, the signal processing unit 107 obtains the voltage signal, performs an A/D conversion therefor, calculates a rotation angle of the secondary gear 103 with using the values of voltage S103 and S104, calculates a θ102 as an angle that such the rotation angle is multiplied by the rotation ratio of 5/9, and then outputs it to the operation processing unit 108. Furthermore, the operation processing unit 108 calculates a rotation angle Φ of the steering shaft X with using the θ101 and the θ102.

Next, a method for detecting a rotation angle of the steering shaft X by using the rotation angle detector 101 will be described in detail below, with reference to FIGS. 10 to 12. First, a method for calculating a rotation angle of the primary gear 102 will be described in detail below, with reference to FIG. 10. Here, the S101 and the S102 as the values of voltage for the voltage signals to be input into the signal processing unit 105 correspond to each one point on sine curved lines L101 and L102 respectively, that have cycles of 180 degrees as shown in such as a graph at an upper stage in FIG. 10 respectively. Here, regarding such the graph, a horizontal axis therein indicates a rotation angle of the primary gear 102 based on an arbitral position therefor, and a vertical axis therein indicates a voltage of the voltage signal. Moreover, the Hall element 104b and 104c are arranged to have the angle of 45 degrees therebetween around the rotation center of the primary gear 102, and then a phase difference of the sine curved lines L101 and the L102 becomes to be 45 degrees.

Next, the signal processing unit 105 normalizes the values of voltage S101 and the S102 by using the following equations (101) and (102). Here, values to be normalized are assumed as M101 and M102; and $$M1=(S101-S101avg)/S101p \tag{101},$$

$$M2=(S102-S102avg)/S102p \tag{102}.$$

Here, the S101avg and the S102avg are average values of the maximum value and the minimum value regarding one cycle of the voltage signal respectively, and the S101p and the S102p are differences between the maximum value and the minimum value regarding the one cycle of the voltage signal respectively. Moreover, regarding the S101avg, the S102avg, the S101p and the S102p, data of the voltage signals are obtained by rotating the primary gear 102 as one rotation at a time of assembling and adjusting the rotation angle detector 101, each of such the values are evaluated using such the data, and then those are memorized in the signal processing unit 105. Further, the normalized values M101 and the M102 to be evaluated in the above mentioned way individually correspond to each one point on the sine curved lines L103 and the L104 having the cycles of 180 degrees respectively, as shown in a graph at a middle stage in FIG. 10. Here, regarding such the graph, a horizontal axis therein indicates a rotation angle of the primary gear 102 based on an arbitral position therefor, and a vertical axis therein indicates a normalized value.

Next, the signal processing unit 105 calculates the θ101 as the rotation angle of the primary gear 102 by using the normalized values M101 and the M102. Here, it is able to calculate the θ101 as below for example.

First, the θ101 is calculated by using an equation (103).

$$\theta 101 = 0.5 \text{ Arctan}(M101/M102) + \alpha \tag{103}.$$

Here, α=45 degrees in a case where M102>0, α=135 degrees in a case where M102<0, meanwhile, θ101=90 degrees in a case where M102=0 and M101>0, and θ101=0 degree in a case where M102=0 and M101<0.

Figure 10:
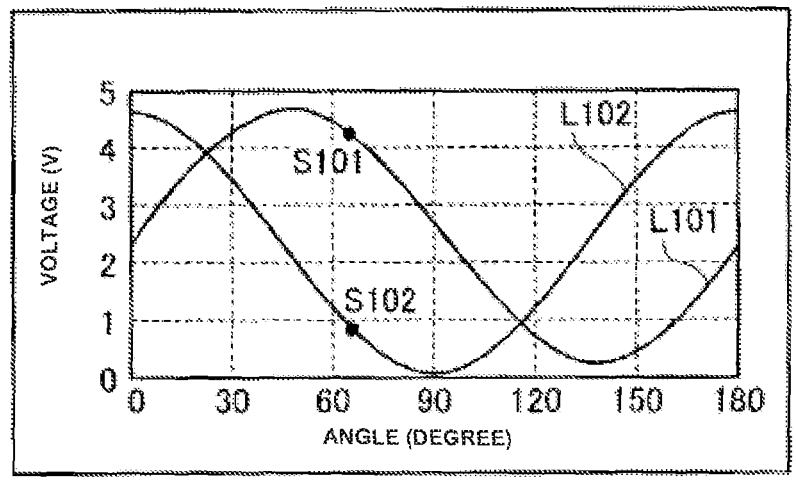
FIG. 10 is a graph explaining a method for calculating a rotation angle of a primary gear regarding a rotation angle detector according to the second embodiment.
Figure 10:
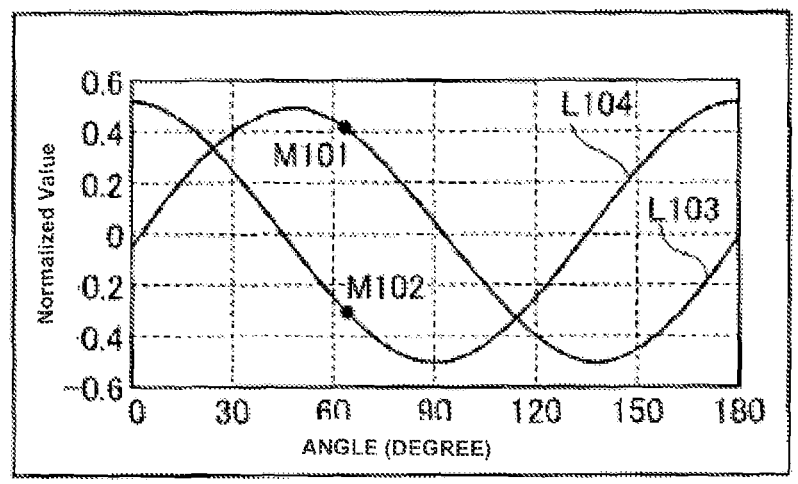
Figure 10:
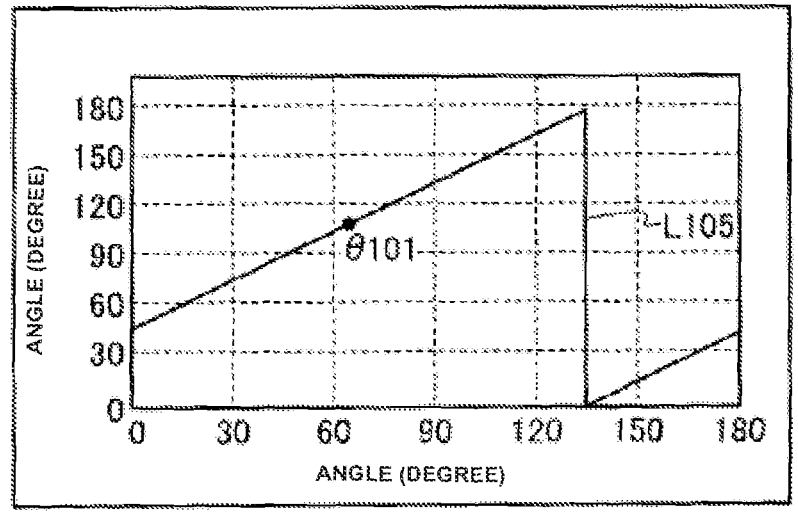

According to the above mentioned method, the calculated angle θ101 corresponds to the one point on a curved line of sawtooth shape L105 having a cycle of 180 degrees as shown in a graph at a lower stage in FIG. 10. Here, regarding such the graph, a horizontal axis therein indicates a rotation angle of the primary gear 102 based on an arbitral position therefor, and a vertical axis therein indicates a calculated rotation angle of the primary gear 102.

Next, a method for calculating a rotation angle of the secondary gear 103 will be described in detail below, however, such the method is almost similar to the method for calculating the rotation angle of the primary gear 102. The S103 and the S104 as the values of voltage for the voltage signals to be input into the signal processing unit 107 individually correspond to each one point on sine curved lines L106 and L107 respectively, that have cycles of 360 degrees as shown in such as a graph at an upper stage in FIG. 11 respectively. Here, regarding such the graph, a horizontal axis therein indicates a rotation angle of the secondary gear 103 based on an arbitral position therefor, and a vertical axis therein indicates a voltage of the voltage signal. Moreover, a phase difference between the sine curved lines L106 and the L107 is 90 degrees.

Next, the signal processing unit 107 normalizes the voltage signals S103 and the S104 to be as M103 and M104 respectively, by using the following equations (104) and (105).

$$M103 = (S103 - S103avg)/S103p \quad (104),$$

$$M104 = (S104 - S104avg)/S104p \quad (105).$$

Here, the S103avg and the S104avg are average values of the maximum value and the minimum value for the voltage signal respectively, and the S103p and the S104p are differences between the maximum value and the minimum value for the voltage signal respectively. Moreover, data of the voltage signals are obtained by rotating the secondary gear 103 as one rotation at a time of assembling and adjusting the rotation angle detector 101, each of such the values are evaluated using such data, and then those are memorized in the signal processing unit 107. Further, the normalized values M103 and the M104 individually correspond to each one point on the sine curved lines L108 and the L109 having the cycles of 360 degrees respectively, as shown in a graph at a middle stage in FIG. 11. Here, a horizontal axis therein indicates a rotation angle of the secondary gear 103 based on an arbitral position therefor, and a vertical axis therein indicates a normalized value.

Next, the signal processing unit 107 calculates a rotation angle of the secondary gear 103 by using the normalized values M103 and the M104, and then calculates the θ102 as the angle that the rotation angle is multiplied by the gear ratio. Here, it is able to calculate the θ102 as below for example.

First, the θ is calculated by using an equation (106).

$$\theta = \text{Arctan}(M103/M104) + \alpha \quad (106).$$

Here, α=90 degrees in a case where M104>0, α=270 degrees in a case where M104<0, meanwhile, θ=180 degrees in a case where M104=0 and M103>0, and θ=0 degree in a case where M104=0 and M103<0.

And then it calculates the θ102 using the θ to be multiplied by the gear ratio of 5/9.

Figure 11:
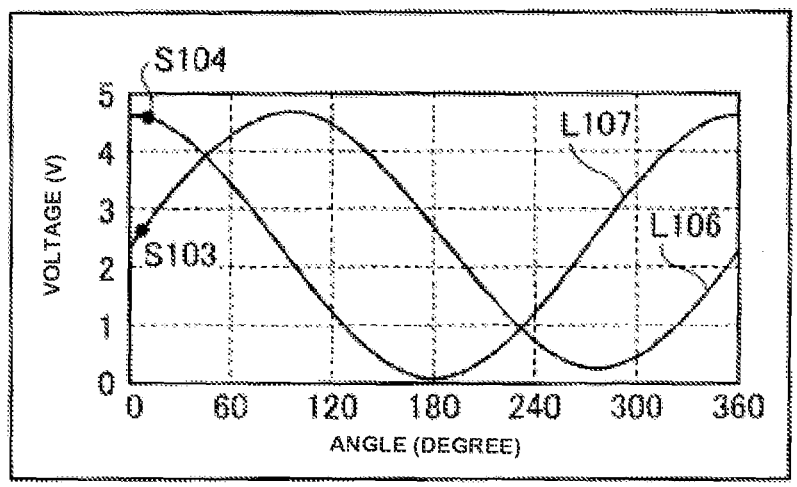
FIG. 11 is a graph explaining a method for calculating a rotation angle of a secondary gear regarding a rotation angle detector according to the second embodiment.
Figure 11:
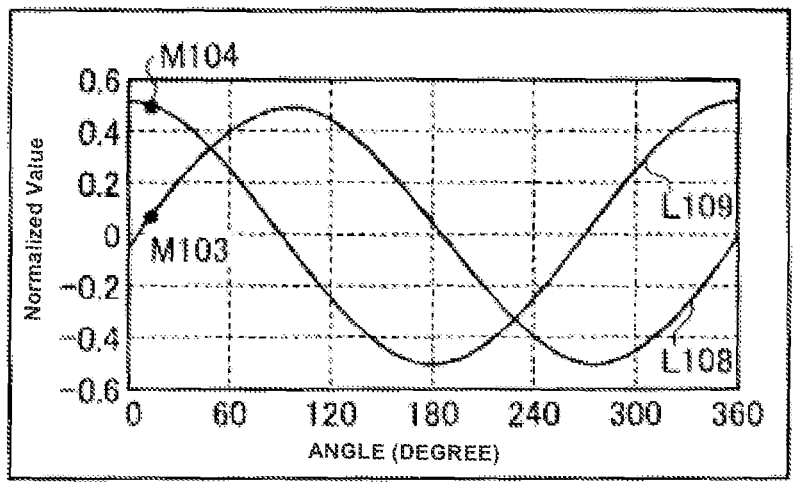
Figure 11:
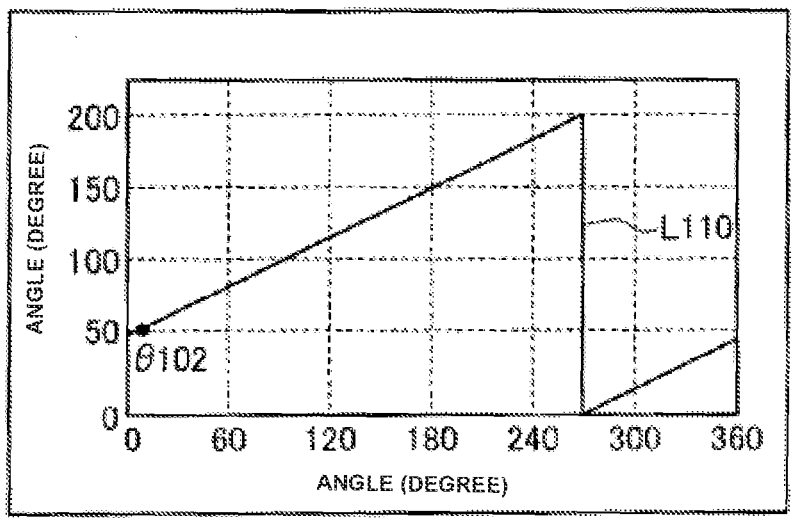

According to the above mentioned method, the calculated angle θ102 corresponds to the one point on a curved line of sawtooth shape L110 having a cycle of 200 degrees as shown in a graph at a lower stage in FIG. 11. Here, regarding such the graph, a horizontal axis therein indicates a rotation angle of the secondary gear 103 based on an arbitral position therefor, and a vertical axis therein indicates an angle that the calculated rotation angle of the secondary gear 103 is multiplied by the gear ratio.

Next, the signal processing units 105 and 107 individually outputs the angles θ101 and the θ102 to the operation processing unit 108 respectively, which is evaluated as mentioned above. Here, according to the rotation angle detector 101 regarding the second embodiment, as the cycle T101 is 180 degrees, of which the primary rotation detection mechanism 104 outputs the signal, and the cycle T102 is 200 degrees, which is obtained by multiplying the gear ratio of 5/9 onto the cycle of the signal that the secondary rotation detection mechanism 106 outputs, as mentioned above. And then the operation processing unit 108 calculates the Φ as the rotation angle of the steering shaft X, with assuming an absolute value as d=|T101−T102| for a difference of the cycles between the cycle T101 and the T102, and by using the following equations (107) and (108).

In a case where θ102≦θ101:

$$\Phi = \theta 101 + T101(\theta 101 - \theta 102)/d \quad (107),$$

In a case where θ102>θ101:

$$\Phi = \theta 101 + T101(\theta 101 - \theta 102)/d + T101\ T102/d \quad (108).$$

Next, in the case where θ102≦θ101, relations among the angles θ101 and the θ102, the cycles T101 and the T102, the difference of the cycles d, and the rotation angle Φ will be described in detail below, with reference to FIG. 12. Here, a horizontal axis in FIG. 12 indicates a range of a detection angle R=T101 T102/|T101−T102|=1800 degrees regarding the rotation angle of the steering shaft X. Moreover, a curved line L111 of sawtooth shape is the curved line L105 of sawtooth shape in FIG. 10 to be arranged as ten cycles within the range of the detection angle R, wherein a vertical axis therein indicates a ratio for the one cycle thereof, and the ratio becomes to be 100% in a case where the angle is 180 degrees. While, a curved line L112 of sawtooth shape is the curved line L110 of sawtooth shape in FIG. 11 to be arranged as nine cycles within the range of the detection angle R, wherein a vertical axis therein indicates a ratio for the one cycle thereof, and the ratio is designed to be 100% in a case where the angle is 200 degrees. Further, regarding the rotation angle Φ, it is designed for a position thereof to be zero degree where a phase of the curved line L111 of sawtooth shape and of the L112 correspond to each other. In such a case, even at a position where the Φ is 1800 degrees, the phase of the curved line L111 of sawtooth shape and of the L112 correspond to each other.

Figure 12:
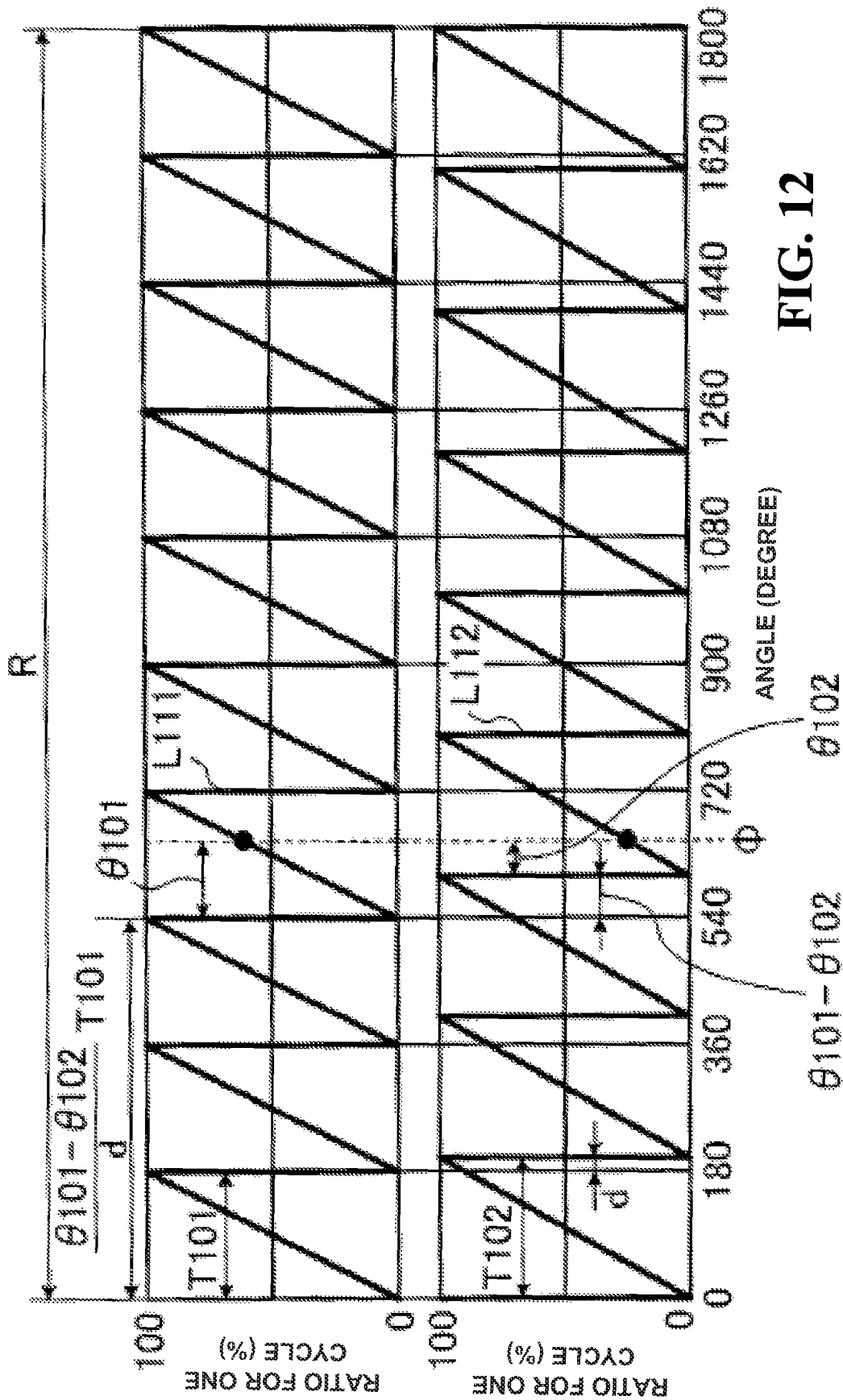
FIG. 12 is a graph explaining relations among angles θ1 and θ2, cycles T1 and T2, a difference of cycles d, and a rotation angle Φ in a case where θ2≦θ1 according to the second embodiment.

Here for example, the angle θ101 and the θ102 are assumed to be calculated individually regarding the primary gear 102 and the secondary gear 103 as shown in FIG. 12. While, the rotation angle Φ is assumed to be calculated by using the equation (107). In such a case, (θ101−θ102) as a relative rotation angle between the primary gear 102 and the secondary gear 103 means a shift of the phases between the curved line L111 of sawtooth shape and the L112. Moreover, because the curved line L111 of sawtooth shape and the L112 have the phases with the shift as the difference of the cycles d for every rotation of the one cycle of the primary gear 102, (θ101−θ102)/d has a value of integer, that is an equation meaning whether the rotation angle Φ includes rotations for how many times of cycles for the primary gear. More specifically, because the cycle T101 and the T102 regarding the primary gear 102 and the secondary gear 103 are 180 degrees and 200 degrees respectively, the d becomes equal to 20 degrees. That is to say, in a case where the primary gear 102 rotates as one cycle, the phase becomes to be shifted as 20 degrees for between the phase of the curved line L111 of sawtooth shape and of the L112. According to FIG. 12, because the rotation angle Φ is the value that the primary gear further rotates as the angle of θ101 from a state that rotates as three cycles, (θ101−θ102)/d=3. Thus, the angles θ101 and the θ102, the cycles T101 and the T102, the difference of the cycles d, and the rotation angle Φ have the above mentioned relations, and then it becomes able to calculate the rotation angle Φ by using the equation (107). On the contrary, in the case where θ102>θ101, the rotation angle Φ means whether including rotations for how many times of cycles for the primary gear, and then an equation becomes to be as [T102−(θ102−θ101)]/d which has a value of integer. And then it becomes able to calculate the rotation angle Φ by using the equation (108).

Thus, the range of the detection angle R is determined by R=T101 T102/|T101−T102|, and the gear ratio k is determined by k=T102 m/360. Hence, the smaller and the smaller the |T101−T102| is, the larger the R becomes, and then the range of the detection becomes to be wider. Therefore, it is necessary to make a difference between the values of the T101 and the T102 to be smaller by bringing close to each other for designing the R to be larger. However, a gear ratio becomes to be larger in a case where the T101 is large, that is to say, the periodicity of n is one and the T101 is 360 degrees for example, or the m is large, and then a gear cannot help but become to be larger in size. For example, according to the above mentioned conventional rotation angle detecting device, in the case where each of the periodicities of the primary gear and the secondary gear is one, that is to say, n=m=1, it is required for a gear ratio to be 5/4 or 5/6 in a case of setting a range of a detection angle R to be 1800 degrees, and then it becomes required for a size of the secondary gear 106 to be as approximately similar to that of the primary gear 102. While, the primary gear 102 is fixed to the steering shaft X by engaging thereto, and then there is a limitation regarding designing the primary gear to be smaller in size. Hence, it cannot help but design the secondary gear to be larger for realizing the above mentioned gear ratio, and then the device becomes to be larger in size thereby. However, according to the rotation angle detector 101, the periodicity of n is determined as two for the continuous signal that the primary rotation detection mechanism 104 outputs, and the periodicity of m is determined as one for the continuous signal that the secondary rotation detection mechanism 106 outputs. Thus, it becomes able to set the secondary gear 103 in the range of detection as similar to each other. While, it is desirable for the m to be one as possible, as it becomes easier to design a configuration of the rotation detection mechanisms.

As above described, according to the rotation angle detector 101 regarding the second embodiment, it becomes able to realize the wider range of the detection angle without designing the device to be larger in size. Moreover, according to the rotation angle detector 101, the primary rotation detection mechanism 104 and the secondary rotation detection mechanism 106 are designed to output individually the continuous analog signals which is varied periodically as corresponding to the rotation of the primary gear 102 or the secondary gear 103. Thus, it becomes able to design it to be smaller in size comparing to the case of using the conventional encoder which outputs the digital signal, because it becomes unnecessary to use a rotor of disk shape that a plurality of slits are formed. Further, according to the second embodiment, it becomes possible to perform an angle detection with a higher resolution in a case where a periodicity is larger and a cycle thereof is shorter as possible regarding a voltage signal that a primary rotation detection mechanism outputs. The reason is because that a resolution of an A/D conversion is fixed to be as ten bits in a full scale for example in a case of inputting a voltage signal, which corresponds to an angle to be detected, into a microcontroller, and then a range of an angle becomes to be smaller, which is to be detected with using ten bits as similar thereto in a case where the shorter the cycle of the voltage signal is. Still further, according to the rotation angle detector 101, it becomes possible to design a further smaller in size thereof, a lighter weight thereof, and a lower manufacturing cost therefor, because the Hall element is used therefor as the magnetic detection element.

Still further, according to the second embodiment, because the equation (107) and the following equation (107a), the equation (108) and the following equation (108a) are equivalent equations therebetween respectively, it may be able to calculate the rotation angle Φ by using the equation (107a) in place of the equation (107), or it may be able to calculate the rotation angle Φ by using the equation (108a) in place of the equation (108) as well.

$$\Phi = \theta102 + T102(\theta101 - \theta102)/d \quad (107a),$$

$$\Phi = \theta102 + T102(\theta101 - \theta102)/d + T101\ T102/d \quad (108a).$$

Still further, the equations (107) and (108) are used in the case of calculating the rotation angle Φ of the steering shaft X, because T101<T102 according to the second embodiment. However, in a case where T101>T102, it is able to calculate a rotation angle by using the following equations (109) and (110).

In a case where θ101<θ102:

$$\Phi = \theta101 + T101(\theta102 - \theta101)/d \quad (109);$$

and in a case where θ101>θ102:

$$\Phi = \theta101 + T101(\theta102 - \theta101)/d + T101\ T102/d \quad (110).$$

Still further, according to the above described embodiment, there is used the Hall element as the magnetic detection element, however, it may be also available to use a magnetoresistive element depend on the usage of the rotation angle detector, that has a temperature dependency as lower and has a higher angle resolution.

Still further, as a modified example of the above described second embodiment, as assuming that the range of the detection angle R is 1800 degrees, that the periodicity of m is one, and that the periodicity of n is three, the T102 becomes to be 112.5 and a gear ratio becomes to be 5/16, and then it becomes able to design a secondary gear to be further smaller in size. Still further, for the n to be determined as three, it may be available to use a hexa-poles magnet as a magnet of ring shape to be attached to a primary gear, that a part of a south pole thereof and a part of a north pole thereof are alternately arranged for three parts by three parts, and is magnetized for generating a magnetic field that an intensity thereof is varied continuously and periodically as a sine wave shape in a rotation direction of the primary gear, and that is designed to be generated as three cycles for one rotation thereof. Here, the m is not limited to one, and it is able to design it to have a value of not less than two but smaller than the n. However, it is desirable to design it as one for designing a secondary gear to be smaller in size. Still further, it is able to set easily the values of the n and the m to be values as desirable respectively, by arranging properly a part of a south pole of a magnet and a part of a north pole thereof to be attached to a primary gear or a secondary gear.

Still further, each of the above described embodiments is the rotation angle detector for which the devices are used as the primary rotation detection mechanism and as the secondary rotation detection mechanism that individually outputs the continuous analog signal. However, it may be also available to use a rotation angle detector for which a device is used as a primary rotation detection mechanism or as a secondary rotation detection mechanism, such as an encoder or the like that outputs a digital signal, and then for performing a signal processing the digital signal to be output therefrom. Furthermore, it is possible to adopt an embodiment which is combined the first embodiment and the second embodiment as well.

INDUSTRIAL APPLICABILITY

It is able to use preferably the rotation angle detector according to the present invention for a case of detecting a rotation angle of a detectable rotation body, such as a steering shaft of an automobile or the like.

What is claimed is:

1. A rotation angle detector for detecting a rotation angle of a detectable rotation body, comprising:
    a primary rotation body to be attached to the detectable rotation body and to rotate as integral with the detectable rotation body;
    a secondary rotation body to rotate as a predetermined rotation ratio for the primary rotation body;
    a primary rotation detection mechanism to output a signal to be varied periodically as corresponding to a rotation of the primary rotation body;
    a secondary rotation detection mechanism to output a signal to be varied periodically as corresponding to a rotation of the secondary rotation body;
    a signal processing unit to calculate the rotation angles of the primary rotation body and the secondary rotation body using the signals that the primary rotation detection mechanism and the secondary rotation detection mechanism output; and
    an operation processing unit to calculate the rotation angle of the detectable rotation body, based on the calculated rotation angle of the primary rotation body or of the secondary rotation body, and on a relative rotation angle between the primary rotation body and the secondary rotation body,
    wherein the operation processing unit calculates a rotation angle φ of the detectable rotation body using the following equations (1) to (4), with assuming the calculated rotation angle of the primary rotation body as θ1, an angle as θ2 of which the calculated rotation angle of the secondary rotation body is multiplied by the predetermined rotation ratio, the converted cycle of the first signal of the primary rotation detection mechanism as T1, a cycle as T2 (T1≠T2) of which the converted cycle of the second signal of the secondary rotation detection mechanism is multiplied by the predetermined rotation ratio, an absolute value |T1−T2| as d for a difference between the cycle T1 and the T2;
    in a case where T1<T2, and θ2≦θ1:

$$\Phi=\theta 1+T1(\theta 1-\theta 2)/d \quad (1);$$

in a case where T1<T2, and θ2>θ1:

$$\Phi=\theta 1+T1(\theta 1-\theta 2)/d+T1T2/d \quad (2);$$

in a case where T1>T2, and θ1≦θ2:

$$\Phi=\theta 1+T1(\theta 2-\theta 1)/d \quad (3); \text{ and}$$

in a case where T1>T2, and θ1>θ2:

$$\Phi=\theta 1+T1(\theta 2-\theta 1)/d+T1T2/d \quad (4).$$

2. A rotation angle detector for detecting a rotation angle of a detectable rotation body, comprising:
    a primary rotation body to be attached to the detectable rotation body and to rotate as integral with the detectable rotation body;
    a secondary rotation body to rotate as a predetermined rotation ratio for the primary rotation body;
    a primary rotation detection mechanism to output a signal to be varied periodically as corresponding to a rotation of the primary rotation body;
    a secondary rotation detection mechanism to output a signal to be varied periodically as corresponding to a rotation of the secondary rotation body;
    a signal processing unit to convert a cycle of the signals that the primary rotation detection mechanism and the secondary rotation detection mechanism output, and to calculate the rotation angles of the primary rotation body and the secondary rotation body regarding the converted cycle by using the signals; and
    an operation processing unit to calculate the rotation angle of the detectable rotation body, based on the calculated rotation angle of the primary rotation body or of the secondary rotation body, on a relative rotation angle between the primary rotation body and the secondary rotation body, and on the converted cycle,
    wherein the operation processing unit calculates a rotation angle Φ of the detectable rotation body using the following equations (1) to (4), with assuming the calculated rotation angle of the primary rotation body as θ1, an angle as θ2 of which the calculated rotation angle of the secondary rotation body is multiplied by the predetermined rotation ratio, the converted cycle of the signal of the primary rotation detection mechanism as T1, a cycle as T2 (T1≠T2) of which the converted cycle of the signal of the secondary rotation detection mechanism is multiplied by the predetermined rotation ratio, an absolute value |T1−T2| as d for a difference between the cycle T1 and the T2;
    in a case where T1<T2, and θ2≦θ1:

$$\Phi=\theta 1+T1(\theta 1-\theta 2)/d \quad (1);$$

in a case where T1<T2, and θ2>θ1:

$$\Phi=\theta 1+T1(\theta 1-\theta 2)/d+T1T2/d \quad (2);$$

in a case where T1>T2, and θ1≦θ2:

$$\Phi=\theta 1+T1(\theta 2-\theta 1)/d \quad (3); \text{ and}$$

in a case where T1>T2, and θ1>θ2:

$$\Phi=\theta 1+T1(\theta 2-\theta 1)/d+T1T2/d \quad (4).$$

3. The rotation angle detector according to claim 2, wherein the converted cycle is determined as a cycle to be a desirable value for an allowable error of the rotation angle for each of the primary rotation body or of the secondary rotation body, and for a range of a detection angle for the rotation angle of the detectable rotation body.

4. A rotation angle detector for detecting a rotation angle of a detectable rotation body, comprising:
    a primary rotation body to be attached to the detectable rotation body and to rotate as integral with the detectable rotation body;
    a secondary rotation body to rotate as a predetermined rotation ratio for the primary rotation body;
    a primary rotation detection mechanism to output a continuous signal to be varied periodically as corresponding to a rotation of the primary rotation body;
    a secondary rotation detection mechanism to output a continuous signal to be varied periodically as corresponding to a rotation of the secondary rotation body;
    a signal processing unit to calculate the rotation angles of the primary rotation body and the secondary rotation body using the signals that the primary rotation detection mechanism and the secondary rotation detection mechanism output; and an operation processing unit to calculate the rotation angle of the detectable rotation body, based on the calculated rotation angle of the primary rotation body or of the secondary rotation body, on a relative rotation angle between the primary rotation body and the secondary rotation body, and on cycles of the signals that the primary rotation detection mechanism and the secondary rotation detection mechanism output, wherein the operation processing unit calculates a rotation angle Φ of the detectable rotation body using the following equations (1) to (4), with assuming the calculated rotation angle of the primary rotation body as θ1, an angle as θ2 of which the calculated rotation angle of the secondary rotation body is multiplied by the predetermined rotation ratio, the converted cycle of the continuous signal of the primary rotation detection mechanism as T1, a cycle as T2 (T1≠T2) of which the converted cycle of the continuous signal of the secondary rotation detection mechanism is multiplied by the predetermined rotation ratio, an absolute value |T1−T2| as d for a difference between the cycle T1 and the T2;

in a case where T1<T2, and θ2≦θ1:

$$\Phi=\theta1+T1(\theta1-\theta2)/d \quad (1);$$

in a case where T1<T2, and θ2>θ1:

$$\Phi=\theta1+T1(\theta1-\theta2)/d+T1T2/d \quad (2);$$

in a case where T1>T2, and θ1≦θ2:

$$\Phi=\theta1+T1(\theta2-\theta1)/d \quad (3); \text{ and}$$

in a case where T1>T2, and θ1>θ2:

$$\Phi=\theta1+T1(\theta2-\theta1)/d+T1T2/d \quad (4).$$

5. A rotation angle detector for detecting a rotation angle of a detectable rotation body, comprising:
- a primary rotation body to be attached to the detectable rotation body and to rotate as integral with the detectable rotation body;
- a secondary rotation body to rotate as a predetermined rotation ratio for the primary rotation body;
- a primary rotation detection mechanism to output a continuous signal to be varied periodically as corresponding to a rotation of the primary rotation body, with a periodicity of n as an integer of not less than two for one rotation of the primary rotation body;
- a secondary rotation detection mechanism to output a continuous signal to be varied periodically as corresponding to a rotation of the secondary rotation body, with a periodicity of m as an integer of less than n but not less than one for one rotation of the secondary rotation body;
- a signal processing unit to calculate the rotation angles of the primary rotation body and the secondary rotation body using the signals that the primary rotation detection mechanism and the secondary rotation detection mechanism output; and an operation processing unit to calculate the rotation angle of the detectable rotation body, based on the calculated rotation angle of the primary rotation body or of the secondary rotation body, on a relative rotation angle between the primary rotation body and the secondary rotation body, and on cycles of the signals that the primary rotation detection mechanism and the secondary rotation detection mechanism output, wherein the operation processing unit calculates a rotation angle Φ of the detectable rotation body using the following equations (1) to (4), with assuming the calculated rotation angle of the primary rotation body as θ1, an angle as θ2 of which the calculated rotation angle of the secondary rotation body is multiplied by the predetermined rotation ratio, the converted cycle of the signal of the primary rotation detection mechanism as T1, a cycle as T2 (T1≠T2) of which the converted cycle of the signal of the secondary rotation detection mechanism is multiplied by the predetermined rotation ratio, an absolute value |T1−T2| as d for a difference between the cycle T1 and the T2;

in a case where T1<T2, and θ2<θ1:

$$\Phi=\theta1+T1(\theta1-\theta2)/d \quad (1);$$

in a case where T1<T2, and θ2>θ1:

$$\Phi=\theta1+T1(\theta1-\theta2)/d+T1T2/d \quad (2);$$

in a case where T1>T2, and θ1≦θ2:

$$\Phi=\theta1+T1(\theta2-\theta1)/d \quad (3); \text{ and}$$

in a case where T1>T2, and θ1>θ2:

$$\Phi=\theta1+T1(\theta2-\theta1)/d+T1T2/d \quad (4).$$

6. The rotation angle detector according to claim 5, wherein the m is one.

7. The rotation angle detector according to any one of claims 2, 4, 5, and 6,
wherein the primary rotation detection mechanism or the secondary rotation detection mechanism comprises:
- a magnet to be attached to the primary rotation body or to the secondary rotation body for generating a magnetic field of which intensity is varied continuously and periodically in a rotation direction thereof; and
- two of magnetic detection elements to be arranged for having a predetermined angle around a center of rotation for the primary rotation body or for the secondary rotation body in a vicinity of the magnet.

8. The rotation angle detector according to claim 7, wherein the magnetic detection element is a Hall element.

9. The rotation angle detector according to claim 7, wherein the magnetic detection element is a magnetoresistive element.

* * * * *